US010236962B2

(12) United States Patent
Yang et al.

(10) Patent No.: US 10,236,962 B2
(45) Date of Patent: Mar. 19, 2019

(54) METHOD FOR MEASURING DOWNLINK CHANNEL QUALITY, TRANSMIT END, RECEIVE END, AND SYSTEM

(71) Applicant: HUAWEI TECHNOLOGIES CO., LTD., Shenzhen, Guangdong (CN)

(72) Inventors: Jing Yang, Shanghai (CN); Hongrui Zhou, Chengdu (CN); Ni Ma, Shanghai (CN); Wei Gu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/139,238

(22) Filed: Sep. 24, 2018

(65) Prior Publication Data

US 2019/0028171 A1    Jan. 24, 2019

Related U.S. Application Data

(63) Continuation of application No. 15/416,544, filed on Jan. 26, 2017, now Pat. No. 10,122,433, which is a
(Continued)

(51) Int. Cl.
*H04B 7/06* (2006.01)
*H04W 36/04* (2009.01)
(Continued)

(52) U.S. Cl.
CPC ......... *H04B 7/0632* (2013.01); *H04B 7/0456* (2013.01); *H04B 7/0469* (2013.01);
(Continued)

(58) Field of Classification Search
CPC .. H04B 7/0456; H04B 7/0469; H04B 7/0473; H04B 7/0478; H04B 7/06; H04B 7/0617;
(Continued)

(56) References Cited

U.S. PATENT DOCUMENTS

2009/0213944 A1*  8/2009  Grant ..................... H04B 1/712
                                                              375/260
2011/0103504 A1     5/2011  Ma
(Continued)

FOREIGN PATENT DOCUMENTS

CN          101960727          1/2011
CN          103141053          6/2013
(Continued)

OTHER PUBLICATIONS

Samsung, "Further details on UE-specific codebook subset restriction," 3GPP TSG RAN WG1 #62bis, R1-105381, Xi'an, China, Oct. 11-15, 2010 (6 pp.).
(Continued)

*Primary Examiner* — Freshteh N Aghdam
(74) *Attorney, Agent, or Firm* — Staas & Halsey LLP

(57) ABSTRACT

A method includes: a transmit end transmits at least two mixed pilot signals to a receive end separately by using at least two physical antennas. The at least two mixed pilot signals are separately obtained after preset pilot signals corresponding to logical antennas in the at least two logical antennas are weighted by using a precoding weight matrix. The transmit sends a first codebook subset restriction instruction to the receive end. The first codebook subset restriction instruction carries a rank indication RANK and at least one precoding matrix index PMI. The transmit end receives a channel quality feedback message that is fed back by the receive end according to downlink channel quality of an equivalent channel of a specified antenna. Accordingly, a suitable serving antenna is selected for a receive end, thereby improving signal quality.

15 Claims, 19 Drawing Sheets

Related U.S. Application Data continuation of application No. PCT/CN2014/083354, filed on Jul. 30, 2014.

(51) Int. Cl.
*H04L 5/00* (2006.01)
*H04B 7/0456* (2017.01)
*H04L 12/26* (2006.01)

(52) U.S. Cl.
CPC ......... *H04B 7/0473* (2013.01); *H04B 7/0478* (2013.01); *H04B 7/06* (2013.01); *H04B 7/0617* (2013.01); *H04B 7/0639* (2013.01); *H04B 7/0658* (2013.01); *H04B 7/0695* (2013.01); *H04B 7/0697* (2013.01); *H04L 5/005* (2013.01); *H04L 5/0023* (2013.01); *H04L 43/16* (2013.01); *H04W 36/04* (2013.01)

(58) Field of Classification Search
CPC .. H04B 7/0632; H04B 7/0639; H04B 7/0658; H04B 7/0695; H04B 7/0697; H04L 43/16; H04L 5/0023; H04L 5/005; H04W 36/04
See application file for complete search history.

(56) References Cited

U.S. PATENT DOCUMENTS

| | | | |
|---|---|---|---|
| 2011/0105064 A1 | 5/2011 | Kusano et al. | |
| 2012/0082192 A1 | 4/2012 | Pelletier et al. | |
| 2013/0114656 A1 | 5/2013 | Sayana et al. | |
| 2014/0177683 A1 | 6/2014 | Krishnamurthy et al. | |
| 2014/0198868 A1* | 7/2014 | Yang ................... | H04B 7/0478 375/267 |
| 2015/0280801 A1* | 10/2015 | Xin ...................... | H04B 7/0478 370/329 |
| 2016/0149626 A1* | 5/2016 | Frenne .................. | H04B 7/022 375/267 |
| 2018/0020433 A1* | 1/2018 | Lee, II ................ | H04J 11/0026 |

FOREIGN PATENT DOCUMENTS

| | | | | |
|---|---|---|---|---|
| CN | 103746779 | | 4/2014 | |
| CN | 103918195 | | 7/2014 | |
| EP | 2696620 A1 | * | 2/2014 | .......... H04B 7/0456 |
| EP | 2696620 | | 12/2014 | |
| WO | WO2009157513 | | 12/2009 | |

OTHER PUBLICATIONS

Renesas Mobile Europe Ltd., "Impact of phase impairments on CQI testing for eDL-MIMO," 3GPP TSG-RAN WG4 Meeting #59AH, R4-113693, Bucharest, Romania, Jun. 27-Jul. 1, 2011 (8 pp.).
Notice of Preliminary Rejection, dated Aug. 20, 2018, in Korean Application No. 10-2017-7001954 (6 pp.).
Notice of Reasons for Rejection, dated Apr. 10, 2018, in Japanese Application No. 2017504686 (9 pp.).
Extended European Search Report dated Jul. 5, 2017 in European Patent Application No. 14898988.2 (8 pp.).
International Search Report dated Apr. 27, 2015 in International Patent Application No. PCT/CN2014/083354 (8 pp.).
Notice of Allowance, dated Jun. 26, 2018, in U.S. Appl. No. 15/416,544 (12 pp.).
Office Action, dated Mar. 8, 2018, in U.S. Appl. No. 15/416,544 (21 pp.).
U.S. Appl. No. 15/416,544, filed Jan. 26, 2017, Yang et al.

* cited by examiner

CONT. FROM FIG. 14A

CONT. FROM FIG. 14A

Step S1406: The receive end receives the at least two mixed pilot signals transmitted by the at least two physical antennas Step S1407: The receive end receives the first codebook subset restriction instruction, and acquires separately, according to the RANK and PMIs, at least two second restriction codebook matrices corresponding to the PMIs Step S1408: The receive end separately acquires equivalent channels of auxiliary beam antennas according to the received mixed pilot signals and the at least two second restriction codebook matrices Step S1409: The receive end separately acquires, according to equivalent channels of at least two auxiliary beam antennas, downlink channel quality of the equivalent channels of the auxiliary beam antennas Step S1410: The receive end acquires downlink CQIs of the equivalent channels of the at least two auxiliary beam antennas according to the downlink channel quality of the equivalent channels of the at least two auxiliary beam antennas Step S1411: The receive end determines an auxiliary beam antenna corresponding to a maximum downlink CQI as a target auxiliary beam antenna, and sends a PMI corresponding to the target auxiliary beam antenna to the transmit end by using a channel quality feedback message Step S1412: The transmit end identifies the target auxiliary beam antenna according to the PMI, and determines to use the target auxiliary beam antenna to serve the receive end

FIG. 14B

CONT. FROM
FIG. 15A

CONT. FROM
FIG. 15A

Step S1506: The receive end acquires, according to the received mixed pilot signals and the third restriction codebook matrix, equivalent channels of macrocell antennas after spatial multiplexing Step S1507: The receive end acquires downlink channel quality of the equivalent channels of the macrocell antennas according to the equivalent channels of the macrocell antennas in the at least two macrocell antennas Step S1508: The receive end acquires downlink CQIs of the equivalent channels of the macrocell antennas according to the downlink channel quality of the equivalent channels of the macrocell antennas, and sends the downlink CQIs to the transmit end by using a channel quality feedback message Step S1509: The transmit end acquires downlink spectral efficiency of the equivalent channels of the macrocell antennas according to the downlink CQIs of the equivalent channels of the macrocell antennas, and calculates downlink spectral efficiency of the equivalent channel of the auxiliary beam antenna according to the downlink CQI, of the equivalent channel of the target auxiliary beam antenna, recorded within the first preset period of time Step S1510: The transmit end determines, according to the downlink spectral efficiency of the equivalent channels of the macrocell antennas and the downlink spectral efficiency of the equivalent channel of the target auxiliary beam antenna, whether to use any macrocell antenna in the at least two macrocell antennas to serve the receive end

FIG. 15B

METHOD FOR MEASURING DOWNLINK CHANNEL QUALITY, TRANSMIT END, RECEIVE END, AND SYSTEM

CROSS-REFERENCE TO RELATED APPLICATIONS

This application is a continuation of U.S. patent application Ser. No. 15/416,544, filed on Jan. 26, 2017, which is a continuation of International Application No. PCT/CN2014/083354, filed on Jul. 30, 2014. All of the afore-mentioned patent applications are hereby incorporated by reference in their entireties.

TECHNICAL FIELD

The present disclosure relates to the field of wireless communications, and in particular, to a method for measuring downlink channel quality, a transmit end, a receive end, and a system.

BACKGROUND

In communication in a beam domain, that is, an auxiliary beam antenna is added on the basis of a conventional macrocell antenna, and the auxiliary beam antenna is combined to serve a terminal inside a sector, thereby implementing improvement of capacity performance. The essence of communication in the beam domain is to maximize gain brought by spatial dimensionality. Such superimposition of at least one auxiliary beam antenna on the basis of a conventional macrocell antenna to perform spatial multiplexing causes a critical problem, that is, how to accurately select a suitable antenna for a terminal user; that is, which antenna is to be used to serve the terminal needs to be specified before a base station (including an indoor base station and an outdoor base station) is to send data to a terminal. Therefore, a base station needs to measure downlink channel quality of a corresponding equivalent channel when each antenna serves the terminal.

A reference signal, that is, a pilot signal, is a known signal that is provided by a transmit end for a receive end and is used for channel estimation or signal measurement. In an LTE (Long Term Evolution) system, an SRS (sounding reference signal) is used for an uplink pilot, that is, a pilot signal transmitted by a terminal to a base station, and the base station acquires, according to an SRS received by each antenna, uplink channel quality of each antenna for the terminal. Generally, the base station estimates downlink channel quality by using channel interchangeability according to the measured uplink channel quality. However, for an FDD (Frequency Division Duplex) system, because uplink and downlink frequencies are different, downlink channel quality estimated by using channel interchangeability has a large error.

SUMMARY

Embodiments of the present invention provide a method for measuring downlink channel quality, a transmit end, a receive end, and a system, so as to accurately acquire downlink channel quality of an equivalent channel of a specified antenna.

A first aspect of an embodiment of the present invention provides a transmit end, including:

a signal transmitting module, configured to transmit at least two mixed pilot signals to a receive end separately by using at least two physical antennas, where the at least two physical antennas correspond to at least two logical antennas, and the at least two mixed pilot signals are separately obtained after preset pilot signals corresponding to logical antennas in the at least two logical antennas are weighted by using a precoding weight matrix;

an instruction sending module, configured to send a first codebook subset restriction instruction to the receive end, where the first codebook subset restriction instruction carries a rank indication RANK and at least one precoding matrix index PMI, so that the receive end acquires downlink channel quality of an equivalent channel of a specified antenna according to the mixed pilot signals, the first codebook subset restriction instruction, and the preset pilot signals; and a feedback message receiving module, configured to receive a channel quality feedback message that is fed back by the receive end according to the downlink channel quality of the equivalent channel of the specified antenna.

A second aspect of an embodiment of the present invention provides a receive end, including:

a signal receiving module, configured to receive at least two mixed pilot signals transmitted by a transmit end by using at least two physical antennas, where the at least two mixed pilot signals are separately obtained after preset pilot signals corresponding to logical antennas in at least two logical antennas are weighted by using a precoding weight matrix;

an instruction receiving module, configured to receive a first codebook subset restriction instruction sent by the transmit end, where the first codebook subset restriction instruction carries a rank indication RANK and at least one precoding matrix index PMI;

a channel quality acquiring module, configured to acquire downlink channel quality of an equivalent channel of a specified antenna according to the mixed pilot signals, the first codebook subset restriction instruction, and the preset pilot signals; and a feedback message sending module, configured to feed back a channel quality feedback message to the transmit end according to the downlink channel quality of the equivalent channel of the specified antenna.

A third aspect of the present invention provides a method for measuring downlink channel quality, including:

transmitting, by a transmit end, at least two mixed pilot signals to a receive end separately by using at least two physical antennas, where the at least two physical antennas correspond to at least two logical antennas, and the at least two mixed pilot signals are separately obtained after preset pilot signals corresponding to logical antennas in the at least two logical antennas are weighted by using a precoding weight matrix;

sending, by the transmit end, a first codebook subset restriction instruction to the receive end, where the first codebook subset restriction instruction carries a rank indication RANK and at least one precoding matrix index PMI, so that the receive end acquires downlink channel quality of an equivalent channel of a specified antenna according to the mixed pilot signals, the first codebook subset restriction instruction, and the preset pilot signals; and receiving, by the transmit end, a channel quality feedback message that is fed back by the receive end according to the downlink channel quality of the equivalent channel of the specified antenna.

A fourth aspect of an embodiment of the present invention provides a method for measuring downlink channel quality, including:

receiving, by a receive end, at least two mixed pilot signals transmitted by a transmit end by using at least two physical antennas, where the at least two mixed pilot signals are separately obtained after preset pilot signals corresponding to logical antennas in at least two logical antennas are weighted by using a precoding weight matrix;

receiving, by the receive end, a first codebook subset restriction instruction sent by the transmit end, where the first codebook subset restriction instruction carries a rank indication RANK and at least one precoding matrix index PMI;

acquiring, by the receive end, downlink channel quality of an equivalent channel of a specified antenna according to the mixed pilot signals, the first codebook subset restriction instruction, and the preset pilot signals; and feeding back, by the receive end, a channel quality feedback message to the transmit end according to the downlink channel quality of the equivalent channel of the specified antenna.

A fifth aspect of an embodiment of the present invention provides a transmit end, where the transmit end includes a wireless transceiver apparatus, a memory, and a processor, where the memory stores a group of program code, and the processor is configured to invoke the program code stored in the memory to execute the following operations:

transmitting at least two mixed pilot signals to a receive end separately by using at least two physical antennas in the wireless transceiver apparatus, where the at least two physical antennas correspond to at least two logical antennas, and the at least two mixed pilot signals are separately obtained after preset pilot signals corresponding to logical antennas in the at least two logical antennas are weighted by using a precoding weight matrix;

sending a first codebook subset restriction instruction to the receive end, where the first codebook subset restriction instruction carries a rank indication RANK and at least one precoding matrix index PMI, so that the receive end acquires downlink channel quality of an equivalent channel of a specified antenna according to the mixed pilot signals, the first codebook subset restriction instruction, and the preset pilot signals; and receiving, by using the wireless transceiver apparatus, a channel quality feedback message that is fed back by the receive end according to the downlink channel quality of the equivalent channel of the specified antenna.

A sixth aspect of an embodiment of the present invention provides a receive end, where the receive end includes a wireless transceiver apparatus, a memory, and a processor, where the memory stores a group of program code, and the processor is configured to invoke the program code stored in the memory to execute the following operations:

receiving at least two mixed pilot signals transmitted by a transmit end by using at least two physical antennas, where the at least two mixed pilot signals are separately obtained after preset pilot signals corresponding to logical antennas in at least two logical antennas are weighted by using a precoding weight matrix;

receiving a first codebook subset restriction instruction sent by the transmit end, where the first codebook subset restriction instruction carries a rank indication RANK and at least one precoding matrix index PMI;

acquiring downlink channel quality of an equivalent channel of a specified antenna according to the mixed pilot signals, the first codebook subset restriction instruction, and the preset pilot signals; and feeding back a channel quality feedback message to the transmit end according to the downlink channel quality of the equivalent channel of the specified antenna.

A seventh aspect of an embodiment of the present invention provides a system for measuring downlink channel quality, where the system includes a transmit end and a receive end, where, the transmit end is the transmit end in the first aspect, or the first possible implementation manner of the first aspect, or the second possible implementation manner of the first aspect, or the third possible implementation manner of the first aspect, or the fourth possible implementation manner of the first aspect, or the fifth possible implementation manner of the first aspect, or the sixth possible implementation manner of the first aspect, or the seventh possible implementation manner of the first aspect; and the receive end is the receive end in the second aspect, or the first possible implementation manner of the second aspect, or the second possible implementation manner of the second aspect, or the third possible implementation manner of the second aspect, or the fourth possible implementation manner of the second aspect, or the fifth possible implementation manner of the second aspect.

An eighth aspect of an embodiment of the present invention provides a computer storage medium, where the computer storage medium stores a program, and the program, when being executed, includes some or all steps of the method for measuring downlink channel quality provided in the third aspect.

A ninth aspect of an embodiment of the present invention provides a computer storage medium, where the computer storage medium stores a program, and the program, when being executed, includes some or all steps of the method for measuring downlink channel quality provided in the fourth aspect.

In the implementation of the embodiments of the present invention, a transmit end can transmit at least two mixed pilot signals to a receive end separately by using at least two physical antennas, where the at least two mixed pilot signals are separately obtained after preset pilot signals corresponding to logical antennas in at least two logical antennas are weighted by using a precoding weight matrix, and the transmit end then sends a codebook subset restriction instruction to the receive end, so that the receive end can acquire downlink channel quality of an equivalent channel of a specified antenna according to the received mixed pilot signals, the codebook subset restriction instruction, and the preset pilot signals; the transmit end can acquire the downlink channel quality of the equivalent channel of the specified antenna according to a channel quality feedback message, so as to accurately acquire the downlink channel quality of the equivalent channel of the specified antenna, and further, the transmit end can select a suitable serve beam for the receive end, thereby improving signal quality.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 14A and FIG. 14B are a schematic flowchart of another beam selection method according to an embodiment of the present invention;

FIG. 15A and FIG. 15B are a schematic flowchart of a mobility management method according to an embodiment of the present invention;

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

In the embodiments of the present invention, a transmit end includes at least one auxiliary beam antenna, and a receive end includes at least two receive antennas. It is assumed that a quantity of transmit antennas at the transmit end is 4, that is, a quantity of physical antennas is 4, where two are macrocell antennas macro0, macro1 having wide coverage and two are auxiliary beam antennas beam0, beam1, and two receive antenna exist at the receive end. A precoding weight matrix Γ is preset. As shown by a matrix (1), p is a power factor of a CSI-RS (Channel-State Information reference signal), and the transmit end may make selection according to a need. The value may be configured by default to be p=√2, where the number of columns in the precoding weight matrix equals the quantity of the physical antennas at the transmit end, and the number of rows in the precoding weight matrix is not limited.

$$p\begin{bmatrix} r_{00} & r_{01} & r_{02} & r_{03} \\ r_{10} & r_{11} & r_{12} & r_{13} \\ r_{20} & r_{21} & r_{22} & r_{23} \\ r_{30} & r_{31} & r_{32} & r_{33} \end{bmatrix} \quad (1)$$

Figure 1:
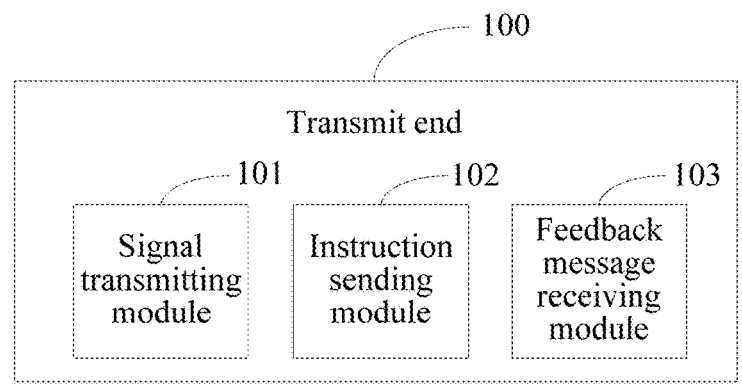
FIG. 1 is a schematic structural diagram of a transmit end according to an embodiment of the present invention.

Referring to FIG. 1, FIG. 1 is a schematic structural diagram of a transmit end provided in an embodiment of the present invention. The transmit end provided in this embodiment of the present invention may include an indoor base station or an outdoor base station. As shown in FIG. 1, a transmit end 100 in this embodiment of the present invention may at least include a signal transmitting module 101, an instruction sending module 102, and a feedback message receiving module 103.

The signal transmitting module 101 is configured to transmit at least two mixed pilot signals to a receive end separately by using at least two physical antennas, where the at least two physical antennas correspond to at least two logical antennas, and the at least two mixed pilot signals are separately obtained after preset pilot signals corresponding to logical antennas in the at least two logical antennas are weighted by using a precoding weight matrix.

The signal transmitting module 101 includes the at least two physical antennas, and each time when the signal transmitting module 101 sends a mixed pilot signal to the receive end, the signal transmitting module 101 sends, to the receive end by using all physical antennas of the signal transmitting module 101, mixed pilot signals corresponding to the physical antennas. For example, the signal transmitting module 101 includes 4 physical antennas, and each time mixed pilot signals are transmitted to the receive end by using the 4 physical antennas.

It is assumed that a specific value of the precoding weight matrix Γ is shown in a matrix (2). Preset pilot signals corresponding to logical antennas Port15, Port16, Port17 and Port18 are respectively $S_{Port15}$ $S_{Port16}$ $S_{Port17}$ $S_{Port18}$, and mixed pilot signals after the preset pilot signals are weighted by using the precoding weight matrix may be shown in a matrix (3). If a correspondence between a physical antenna and a logical antenna is that: beam0 corresponds to Port15, beam1 corresponds to Port15, macro0 corresponds to Port17, and macro1 corresponds to Port18, mixed pilot signals corresponding to the physical antennas are separately as follows: beam0 corresponds to a first-column mixed pilot signal, beam1 corresponds to a second-column mixed pilot signal, macro0 corresponds to a third-column mixed pilot signal, and macro1 corresponds to a fourth-column mixed pilot signal.

$$\frac{1}{p}\begin{bmatrix} 1 & 1 & 1 & 1 \\ 1 & 1 & -1 & -1 \\ 1 & -1 & 1 & -1 \\ 1 & -1 & -1 & 1 \end{bmatrix} \quad (2)$$

$$\begin{bmatrix} S_{Port15} & S_{Port16} & S_{Port17} & S_{Port18} \\ S_{Port15} & S_{Port16} & -S_{Port17} & -S_{Port18} \\ S_{Port15} & -S_{Port16} & S_{Port17} & -S_{Port18} \\ S_{Port15} & -S_{Port16} & -S_{Port17} & S_{Port18} \end{bmatrix} \quad (3)$$

Specifically, the signal transmitting module 101 may generate a mixed pilot signal in advance. Next, the signal transmitting module 101 controls, at intervals of a preset period, for example, 5 ms, physical antennas of the signal transmitting module 101 to separately transmit mixed pilot signals corresponding to the physical antennas. The signal transmitting module 101 may also generate mixed pilot signals at intervals of a preset period, and then separately transmit, by using the physical antennas of the signal transmitting module 101, mixed pilot signals corresponding to the physical antennas.

It should be noted that in this embodiment of the present invention, the signal transmitting module 101 only weights preset pilot signals in advance. In other optional embodiments, especially, in the protocol release Release 8 (the protocol release of the 3GPP for the LTE), the signal transmitting module 101 may weight a common pilot (CRS) signal, and a codebook restriction function is combined to enable the receive end to implement measurement of downlink channel quality of an equivalent channel of a specified antenna, where when a CRS pilot is weighted in advance, all common channels or data channels that are demodulated based on the CRS pilot also need to be weighted in advance synchronously.

The instruction sending module 102 is configured to send a first codebook subset restriction instruction to the receive end, where the first codebook subset restriction instruction carries a rank indication RANK and at least one precoding matrix index PMI, so that the receive end acquires the downlink channel quality of the equivalent channel of the specified antenna according to the mixed pilot signals, the first codebook subset restriction instruction, and the preset pilot signals.

The feedback message receiving module 103 is configured to receive a channel quality feedback message that is fed back by the receive end according to the downlink channel quality of the equivalent channel of the specified antenna.

In an optional implementation manner, the RANK and the PMI point to a first restriction codebook matrix, and the first restriction codebook matrix is used for acquiring downlink channel quality of equivalent channels of at least two auxiliary beam antennas after spatial multiplexing, so that the channel quality feedback message received by the feedback message receiving module 103 includes downlink CQIs of the equivalent channels of auxiliary beam antennas in the at least two auxiliary beam antennas.

Figure 2:
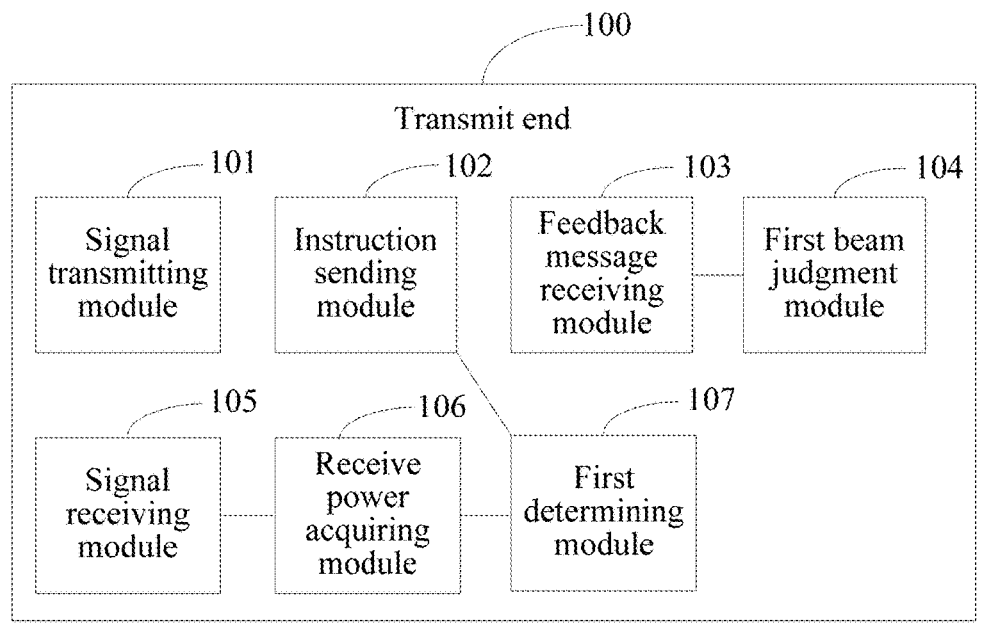
FIG. 2 is a schematic structural diagram of another transmit end according to an embodiment of the present invention.

As shown in FIG. 2, the transmit end 100 may further include a first beam judgment module 104, configured to determine, according to the downlink CQIs, of the equivalent channels of the at least two auxiliary beam antennas, received by the feedback message receiving module 103, whether to use any auxiliary beam antenna in the at least two auxiliary beam antennas to serve the receive end.

Figure 3:
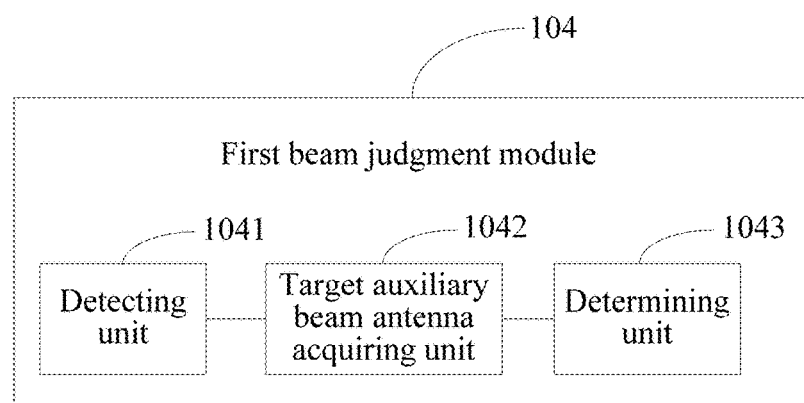
FIG. 3 is a schematic structural diagram of a first beam judgment module according to an embodiment of the present invention.

Specifically, FIG. 3 is a schematic structural diagram of the first beam judgment module according to an embodiment of the present invention, and as shown in FIG. 3, the first beam judgment module 104 may include: a detecting unit 1041, a target auxiliary beam antenna acquiring unit 1042, and a determining unit.

The detecting unit 1041 is configured to detect whether an auxiliary beam antenna having an equivalent channel with a downlink CQI greater than a preset threshold exists in the at least two auxiliary beam antennas.

The target auxiliary beam antenna acquiring unit 1042 is configured to: if an auxiliary beam antenna having an equivalent channel with a downlink CQI greater than the preset threshold exists in the at least two auxiliary beam antennas, acquire a target auxiliary antenna from the at least two auxiliary beam antennas according to the downlink CQIs of the equivalent channels of the at least two auxiliary beam antennas.

The determining unit 1043 is configured to determine to use the target auxiliary beam antenna to serve the receive end.

Furthermore, the transmit end 100 may further include: a signal receiving module 105, a receive power acquiring module 106, and a first determining module 107.

The signal receiving module 105 is configured to separately receive a sounding reference signal of the receive end by using the at least two physical antennas.

The receive power acquiring module 106 is configured to acquire receive power of the at least two physical antennas separately for the receive end according to the sounding reference signal received within a second preset period of time.

The first determining module 107 is configured to determine, according to the receive power of the at least two physical antennas separately for the receive end, that the receive end meets an initial condition of using an auxiliary beam antenna, and after the signal transmitting module 101 transmits the mixed pilot signals to the receive end, trigger the instruction sending module 102 to send the first codebook subset restriction instruction to the receive end.

In another optional implementation manner, the first codebook subset restriction instruction carries at least two PMIs, and the RANK and each PMI in the at least two PMIs separately point to at least two second restriction codebook matrices. It is assumed that a first codebook subset restriction only carries two PMIs, the RANK and one PMI point to one second restriction codebook matrix, and the RANK and the other PMI point to another second restriction codebook matrix. The at least two second restriction codebook matrices are separately used for acquiring downlink channel quality of equivalent channels of at least two auxiliary beam antennas. The channel quality feedback message received by the feedback message receiving module 103 includes a PMI corresponding to a target auxiliary beam antenna, where the target auxiliary beam antenna is determined from the at least two auxiliary beam antennas by the receive end according to the mixed pilot signals, the at least two second restriction codebook matrices, and the preset pilot signals.

Figure 4:
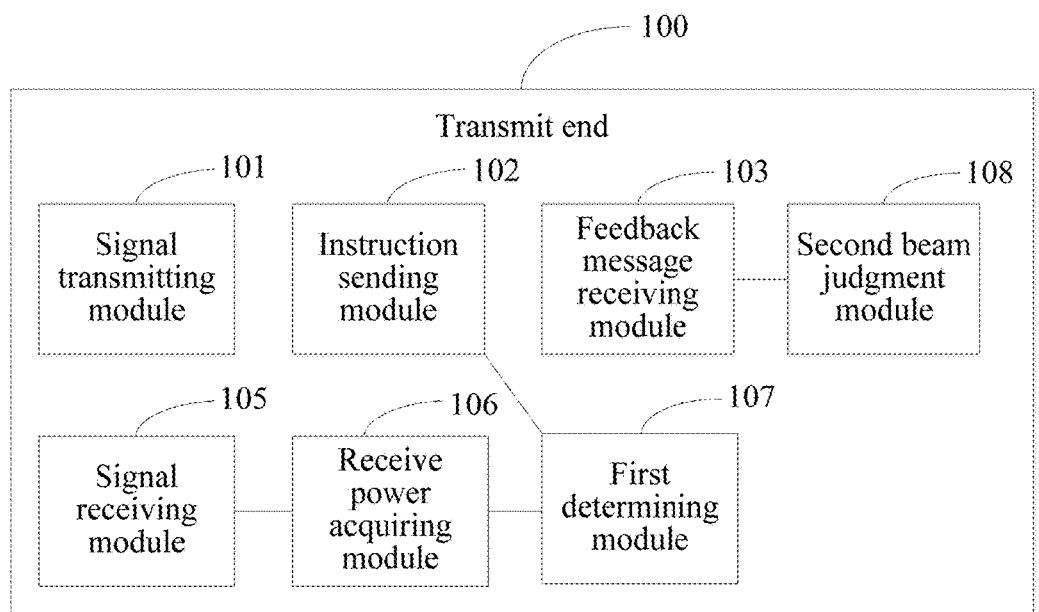
FIG. 4 is a schematic structural diagram of another transmit end according to an embodiment of the present invention.

As shown in FIG. 4, the transmit end 100 may further include a second beam judgment module 108, configured to identify the target auxiliary beam antenna according to the channel quality feedback message, and determine to use the target auxiliary beam antenna to serve the receive end.

Furthermore, the transmit end 100 may further include: the signal receiving module 105, the receive power acquiring module 106, and the first determining module 107.

The signal receiving module 105 is configured to separately receive a sounding reference signal of the receive end by using the at least two physical antennas.

The receive power acquiring module 106 is configured to acquire receive power of the at least two physical antennas separately for the receive end according to the sounding reference signal received within a second preset period of time.

The first determining module 107 is configured to determine, according to the receive power of the at least two physical antennas separately for the receive end, that the receive end meets an initial condition of using an auxiliary beam antenna, and after the signal transmitting module 101 transmits the mixed pilot signals to the receive end, trigger the instruction sending module 102 to send the first codebook subset restriction instruction to the receive end.

Figure 5:
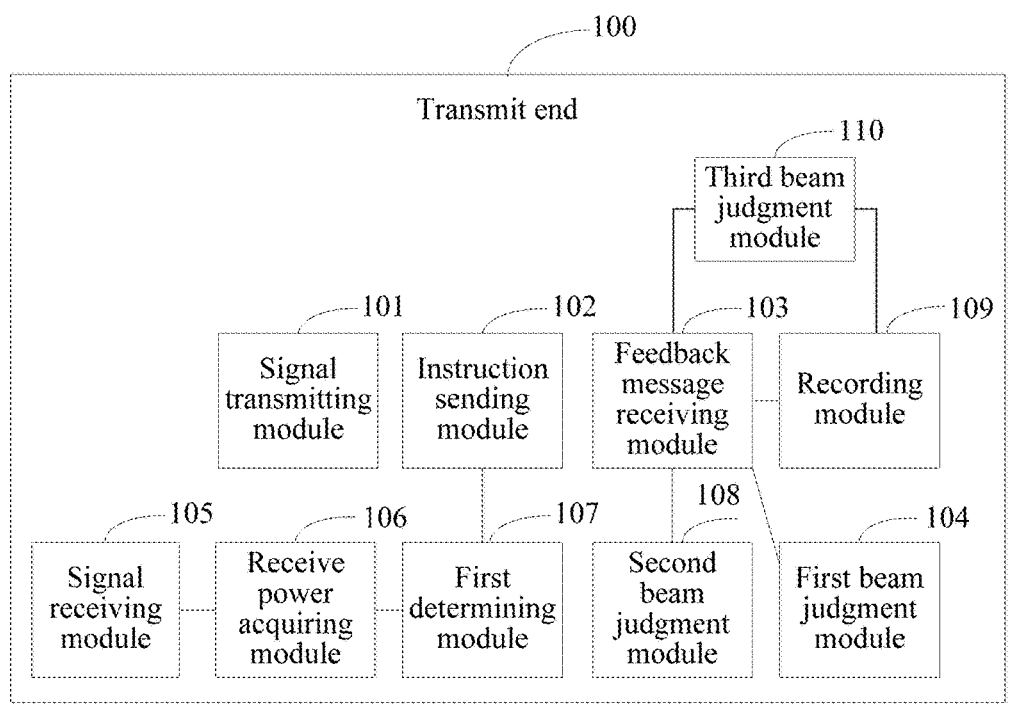
FIG. 5 is a schematic structural diagram of another transmit end according to an embodiment of the present invention.

Furthermore, FIG. 5 is a schematic structural diagram of another transmit end provided in an embodiment of the present invention, and as shown in FIG. 5, the transmit end 100 may further include a recording module 109 and a third beam judgment module 110.

The recording module is configured to record a downlink CQI of an equivalent channel of the target auxiliary antenna within a first preset period of time.

When the first beam judgement module 104 determines to use the target auxiliary beam antenna to serve the receive end, or, the second beam judgment module 108 identifies the target auxiliary beam antenna according to the channel quality feedback message, and determines to use the target auxiliary beam antenna to serve the receive end, the recording module 109 records the downlink CQI of the equivalent channel of the target auxiliary antenna within the first preset period of time, and the instruction sending module 102 may further send a second codebook subset restriction instruction to the receive end, where a RANK and a PMI carried in the second codebook subset restriction instruction point to a third restriction codebook matrix, the third restriction codebook matrix is used for acquiring downlink channel quality of equivalent channels of at least two macrocell antennas after spatial multiplexing, and the channel quality feedback message received by the feedback message receiving module 103 further includes downlink CQIs of the equivalent channels of macrocell antennas in the at least two macrocell antennas.

The third beam judgment module 110 is configured to determine, according to the downlink CQIs of the equivalent channels of the macrocell antennas and the downlink CQI of the equivalent channel of the target auxiliary antenna recorded by the recording module 109 within the first preset period of time, whether to use any macrocell antenna in the at least two macrocell antennas to serve the receive end.

Figure 6:
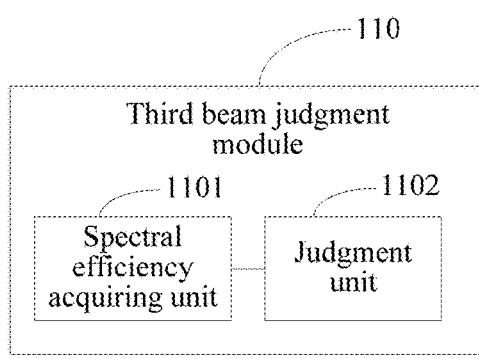
FIG. 6 is a schematic structural diagram of a third beam judgment module according to an embodiment of the present invention.

Specifically, FIG. 6 is a schematic structural diagram of the third beam judgment module according to an embodiment of the present invention, and as shown in FIG. 6, the third determining module 110 may further include: a spectral efficiency acquiring unit 1101 and a judgment unit 1102.

The spectral efficiency acquiring unit 1101 is configured to acquire downlink spectral efficiency of the equivalent channels of the macrocell antennas according to the downlink CQIs of the equivalent channels of the macrocell antennas, and calculate downlink spectral efficiency of the equivalent channel of the target auxiliary antenna according to the recorded downlink CQI of the equivalent channel of the target auxiliary antenna within the first preset period of time.

The judgment unit 1102 is configured to determine, according to the downlink spectral efficiency of the equivalent channels of the macrocell antennas and the downlink spectral efficiency of the equivalent channel of the target auxiliary antenna, whether to use any macrocell antenna in the at least two macrocell antennas to serve the receive end.

Figure 7:
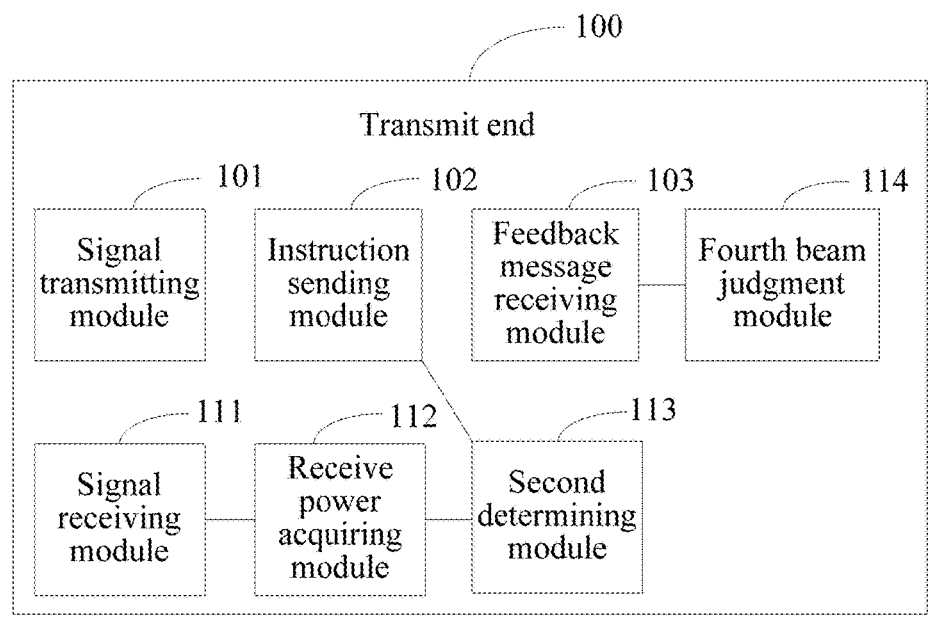
FIG. 7 is a schematic structural diagram of another transmit end according to an embodiment of the present invention.

In still another optional implementation manner, FIG. 7 is a schematic structural diagram of another transmit end provided in an embodiment of the present invention, and as shown in FIG. 7, the transmit end 100 may further include: a signal receiving module 111, a receive power acquiring module 112, a second determining module 113, and a fourth beam judgment module 114.

The signal receiving module 111 is configured to separately receive a sounding reference signal of the receive end by using the at least two physical antennas.

The receive power acquiring module 112 is configured to acquire receive power of the at least two physical antennas separately for the receive end according to the sounding reference signal received within a second preset period of time.

The second determining module 113 is configured to determine, according to the receive power of the at least two physical antennas separately for the receive end, a main beam and a multiplexing antenna beam of the receive end.

The RANK and the PMI point to a fourth restriction codebook matrix, the fourth restriction codebook matrix is used for acquiring downlink channel quality of equivalent channels of the main beam and the multiplexing antenna beam after spatial multiplexing, and the channel quality feedback message received by the feedback message receiving module 103 includes a downlink CQI of the equivalent channel of the main beam and a downlink CQI of the equivalent channel of the multiplexing antenna beam.

The fourth beam judgment module 114 is configured to determine, according to the downlink CQI of the equivalent channel of the main beam and the downlink CQI of the equivalent channel of the multiplexing antenna beam, whether to use the main beam and the multiplexing antenna beam to serve the receive end.

It may be understood that the functions of functional modules of the transmit end 100 in this embodiment may be specifically implemented according to the methods in the following method embodiments, and reference may be specifically and correspondingly made to related description of the method embodiments in FIG. 12 to FIG. 17B, and details are not described herein again.

Figure 8:
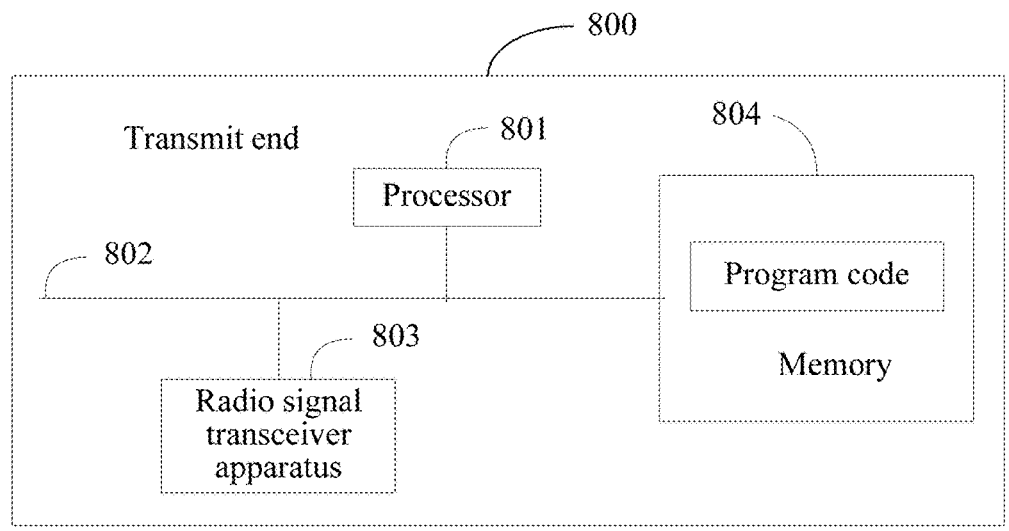
FIG. 8 is a schematic structural diagram of another transmit end according to an embodiment of the present invention.

Referring to FIG. 8, FIG. 8 is a schematic structural diagram of a transmit end provided in another embodiment of the present invention. As shown in FIG. 8, the transmit end 800 may include: at least one processor 801, for example, a CPU, at least one communications bus 802, a radio signal transceiver apparatus 803, and a memory 804. The radio signal transceiver apparatus 803 includes a physical antenna, configured to receive a radio signal transmitted by a terminal (that is, a receive end) and transmit a radio signal to the terminal. The communications bus 802 is configured to implement connection and communication between these components. The memory 804 may be a high-speed RAM memory, or may also be a non-volatile memory, for example, at least one disk memory. The memory 804 stores a group of program code, and the processor 801 is configured to invoke the program code stored in the memory 804 to execute the following operations:

separately transmitting, by using at least two physical antennas in the radio signal transceiver apparatus 803, at least two mixed pilot signals to a receive end, where the at least two physical antennas correspond to at least two logical antennas, and the at least two mixed pilot signals are separately obtained after preset pilot signals corresponding to logical antennas in the at least two logical antennas are weighted by using a precoding weight matrix;

sending a first codebook subset restriction instruction to the receive end, where the first codebook subset restriction instruction carries a rank indication RANK and at least one precoding matrix index PMI, so that the receive end acquires downlink channel quality of an equivalent channel of a specified antenna according to the mixed pilot signals, the first codebook subset restriction instruction, and the preset pilot signals; and receiving, by using the radio signal transceiver apparatus 803, a channel quality feedback message that is fed back by the receive end according to the downlink channel quality of the equivalent channel of the specified antenna.

In an optional implementation manner, the RANK and the PMI point to a first restriction codebook matrix, and the first restriction codebook matrix is used for acquiring downlink channel quality of equivalent channels of at least two auxiliary beam antennas after spatial multiplexing.

The channel quality feedback message includes downlink channel quality indications CQIs of the equivalent channels of auxiliary beam antennas in the at least two auxiliary beam antennas.

The processor 801 further executes, after the receiving, by using the radio signal transceiver apparatus 803, a channel quality feedback message that is fed back by the receive end according to the downlink channel quality of the equivalent channel of the specified antenna, the following operations:

determining, according to the downlink CQIs of the equivalent channels of the auxiliary beam antennas in the at least two auxiliary beam antennas, whether to use any auxiliary beam antenna in the at least two auxiliary beam antennas to serve the receive end.

Optionally, the determining, by the processor 801, according to the downlink CQIs of the equivalent channels of the auxiliary beam antennas in the at least two auxiliary beam antennas, whether to use any auxiliary beam antenna in the at least two auxiliary beam antennas to serve the receive end may specifically be:

detecting whether an auxiliary beam antenna having an equivalent channel with a downlink CQI greater than a preset threshold exists in the at least two auxiliary beam antennas;

if an auxiliary beam antenna whose equivalent channel of which a downlink CQI is greater than the preset threshold exists in the at least two auxiliary beam antennas, acquiring a target auxiliary antenna from the at least two auxiliary beam antennas according to the downlink CQIs of the equivalent channels of the at least two auxiliary beam antennas; and determining to use the target auxiliary beam antenna to serve the receive end.

In another optional implementation manner, the first codebook subset restriction instruction carries at least two PMIs, the RANK and each PMI in the at least two PMIs separately point to at least two second restriction codebook matrices, and the at least two second restriction codebook matrices are separately used for acquiring downlink channel quality of equivalent channels of at least two auxiliary beam antennas.

The channel quality feedback message includes a PMI corresponding to a target auxiliary beam antenna, and the target auxiliary beam antenna is determined from the at least two auxiliary beam antennas by the receive end according to the mixed pilot signals, the at least two second restriction codebook matrices, and the preset pilot signals.

The processor 801 further executes, after the receiving, by using the radio signal transceiver apparatus 803, a channel quality feedback message fed back by the receive end according to the acquired downlink channel quality of the equivalent channel of the specified antenna, the following operations:

identifying the target auxiliary beam antenna according to the channel quality feedback message; and determining to use the target auxiliary beam antenna to serve the receive end.

Furthermore, the processor 801 further executes, after the determining to use the target auxiliary beam antenna to serve the receive end, the following operations:

recording a downlink CQI of an equivalent channel of the target auxiliary antenna within a first preset period of time;

sending a second codebook subset restriction instruction to the receive end, where a RANK and a PMI carried in the second codebook subset restriction instruction point to a third restriction codebook matrix, and the third restriction codebook matrix is used for acquiring downlink channel quality of equivalent channels of at least two macrocell antennas after spatial multiplexing;

receiving the channel quality feedback message including downlink CQIs of the equivalent channels of macrocell antennas in the at least two macrocell antennas; and determining, according to the downlink CQIs of the equivalent channels of the macrocell antennas and the downlink CQI of the equivalent channel of the target auxiliary antenna recorded within the first preset period of time, whether to use any macrocell antenna in the at least two macrocell antennas to serve the receive end.

The determining, by the processor 801, according to the downlink CQIs of the equivalent channels of the macrocell antennas and the downlink CQI of the equivalent channel of the target auxiliary antenna recorded within the first preset period of time, whether to use any macrocell antenna in the at least two macrocell antennas to serve the receive end is specifically:

acquiring downlink spectral efficiency of the equivalent channels of the macrocell antennas according to the downlink CQIs of the equivalent channels of the macrocell antennas, and calculating downlink spectral efficiency of the equivalent channel of the target auxiliary antenna according to the recorded downlink CQI of the equivalent channel of the target auxiliary antenna within the first preset period of time; and determining, according to the downlink spectral efficiency of the equivalent channels of the macrocell antennas and the downlink spectral efficiency of the equivalent channel of the target auxiliary antenna, whether to use any macrocell antenna in the at least two macrocell antennas to serve the receive end.

Furthermore, the processor 801 further executes, before the sending a first codebook subset restriction instruction to the receive end, the following operations:

separately receiving a sounding reference signal of the receive end by using the at least two physical antennas;

acquiring receive power of the at least two physical antennas separately for the receive end according to the sounding reference signal received within a second preset period of time; and determining, according to the receive power of the at least two physical antennas separately for the receive end, that the receive end meets an initial condition of using an auxiliary beam antenna.

In still another optional implementation manner, the processor 801, before the sending a first codebook subset restriction instruction to the receive end, further executes the following operations:

separately receiving a sounding reference signal of the receive end by using the at least two physical antennas;

acquiring receive power of the at least two physical antennas separately for the receive end according to the sounding reference signal received within a second preset period of time; and determining, according to the receive power of the at least two physical antennas separately for the receive end, a main beam and a multiplexing antenna beam of the receive end.

The RANK and the PMI point to a fourth restriction codebook matrix, and the fourth restriction codebook matrix is used for acquiring downlink channel quality of equivalent channels of the main beam and the multiplexing antenna beam after spatial multiplexing.

The channel quality feedback message includes a downlink CQI of the equivalent channel of the main beam and a downlink CQI of the equivalent channel of the multiplexing antenna beam.

The processor 801 further executes, after the receiving, by using the radio signal transceiver apparatus 803, a channel quality feedback message fed back, according to the acquired downlink channel quality of the specified antenna, by the receive end, the following operation:

determining, according to the downlink CQI of the equivalent channel of the main beam and the downlink CQI of the equivalent channel of the multiplexing antenna beam, whether to use the main beam and the multiplexing antenna beam to serve the receive end.

It may be understood that the functions of functional modules of the transmit end 800 in this embodiment may be specifically implemented according to the methods in the following method embodiments, and reference may be specifically and correspondingly made to related description of the method embodiments in FIG. 12 to FIG. 17B, and details are not described herein again.

The transmit end 100 in this embodiment of the present invention is described in detail above, and to facilitate better implementation of the foregoing solution in this embodiment of the present invention below, correspondingly, a receive end is further provided below.

Figure 9:
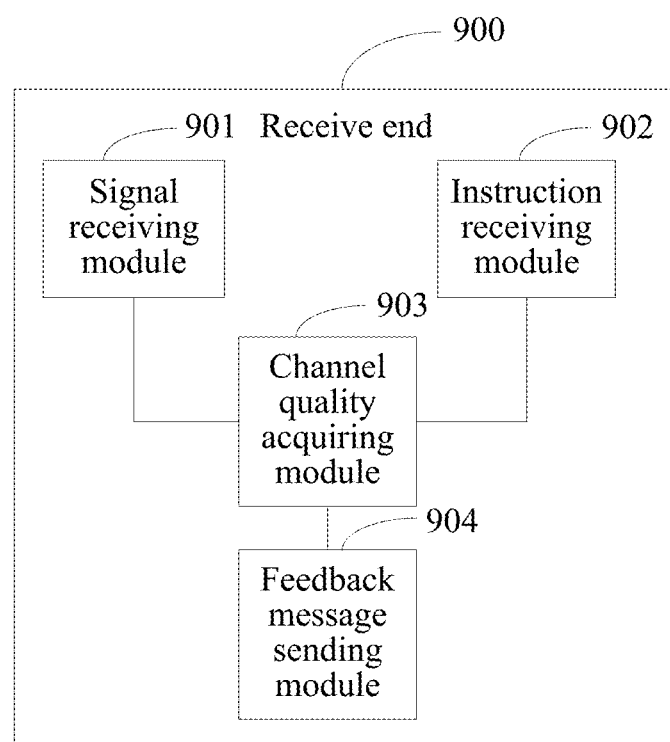
FIG. 9 is a schematic structural diagram of a receive end according to an embodiment of the present invention.

Referring to FIG. 9, FIG. 9 is a schematic structural diagram of a receive end provided in an embodiment of the present invention. The receive end provided in this embodiment of the present invention may be a communications terminal such as a mobile phone, a personal computer, and a PAD. As shown in FIG. 9, a receive end 900 in this embodiment of the present invention may at least include: a signal receiving module 901, an instruction receiving module 902, a channel quality acquiring module 903, and a feedback message sending module 904.

The signal receiving module 901 is configured to receive at least two mixed pilot signals transmitted by a transmit end by using at least two physical antennas, where the at least two mixed pilot signals are separately obtained after preset pilot signals corresponding to logical antennas in at least two logical antennas are weighted by using a precoding weight matrix.

The instruction receiving module 902 is configured to receive a first codebook subset restriction instruction sent by the transmit end, where the first codebook subset restriction instruction carries a rank indication RANK and at least one precoding matrix index PMI.

The channel quality acquiring module 903 is configured to acquire downlink channel quality of an equivalent channel of a specified antenna according to the mixed pilot signals, the first codebook subset restriction instruction, and the preset pilot signals.

The feedback message sending module 904 is configured to feed back a channel quality feedback message to the transmit end according to the downlink channel quality of the equivalent channel of the specified antenna.

In an optional implementation manner, the RANK and the PMI point to a first restriction codebook matrix, and the first restriction codebook matrix is used for acquiring downlink channel quality of equivalent channels of at least two auxiliary beam antennas after spatial multiplexing.

The channel quality acquiring module 903 is specifically configured to:

acquire the first restriction codebook matrix according to the RANK and the PMI; and acquire, according to the mixed pilot signals, the first restriction codebook matrix, and the preset pilot signals, the downlink channel quality of the equivalent channels of the at least two auxiliary beam antennas after spatial multiplexing.

The feedback message sending module 904 is specifically configured to:

acquire downlink CQIs of the equivalent channels of the at least two auxiliary beam antennas according to the downlink channel quality of the equivalent channels of the at least two auxiliary beam antennas.

The channel quality feedback message sent by the feedback message sending module 904 includes the downlink CQIs of the equivalent channels of the at least two auxiliary beam antennas, so that the transmit end determines, according to the downlink CQIs of the equivalent channels of the at least two auxiliary beam antennas, whether to use any auxiliary beam antenna in the at least two auxiliary beam antennas to serve the receive end.

In another optional implementation manner, the first codebook subset restriction instruction carries at least two PMIs, and the RANK and each PMI in the at least two PMIs separately point to at least two second restriction codebook matrices. It is assumed that a first codebook subset restriction instruction carries two PMIs. That is, the RANK and one PMI point to one second restriction codebook matrix, and the RANK and the other PMI point to another second restriction codebook matrix. The at least two second restriction codebook matrices are separately used for acquiring downlink channel quality of equivalent channels of at least two auxiliary beam antennas.

The channel quality acquiring module 903 is specifically configured to:

acquire the at least two second restriction codebook matrices separately according to the RANK and the at least two PMIs; and acquire the downlink channel quality of the equivalent channels of the at least two auxiliary beam antennas according to the mixed pilot signals, the at least two second restriction codebook matrices, and the preset pilot signals.

The feedback message sending module 904 is specifically configured to:

acquire downlink CQIs of the equivalent channels of the at least two auxiliary beam antennas according to the downlink channel quality of the equivalent channels of the at least two auxiliary beam antennas; and determine a target auxiliary beam antenna from the at least two auxiliary beam antennas according to the downlink CQIs of the equivalent channels of the at least two auxiliary beam antennas.

The channel quality feedback message sent by the feedback message sending module 904 includes a PMI of the target auxiliary beam antenna, so that the transmit end determines, according to the PMI, to use the target auxiliary beam antenna to serve the receive end.

Furthermore, the instruction receiving module 902 may be further configured to:

receive a second codebook subset restriction instruction sent by the transmit end, where a RANK and a PMI carried in the second codebook subset restriction instruction point to a third restriction codebook matrix, and the third restriction codebook matrix is used for acquiring downlink channel quality of equivalent channels of at least two macrocell antennas after spatial multiplexing.

The channel quality acquiring module 903 is specifically further configured to:

acquire the third restriction codebook matrix according to the RANK and the PMI; and acquire, according to the mixed pilot signals, the third restriction codebook matrix, and the preset pilot signals, the downlink channel quality of the equivalent channels of the at least two macrocell antennas after spatial multiplexing.

The feedback message sending module 904 is specifically further configured to:

acquire downlink CQIs of the equivalent channels of the at least two macrocell antennas according to the downlink channel quality of the equivalent channels of the at least two macrocell antennas after spatial multiplexing.

The channel quality feedback message sent by the feedback message sending module 904 further includes the downlink CQIs of the equivalent channels of the at least two macrocell antennas, so that the transmit end determines, according to the downlink CQIs of the equivalent channels of the at least two macrocell antennas, whether to use any macrocell antenna in the at least two macrocell antennas to serve the receive end.

Furthermore, the receive end in this embodiment of the present invention may further include a signal sending module 905, configured to send a sounding reference signal to the transmit end, so that the transmit end determines, according to the sounding reference signal, that the receive end meets an initial condition of using any auxiliary beam antenna in the at least two auxiliary beam antennas.

Figure 10:
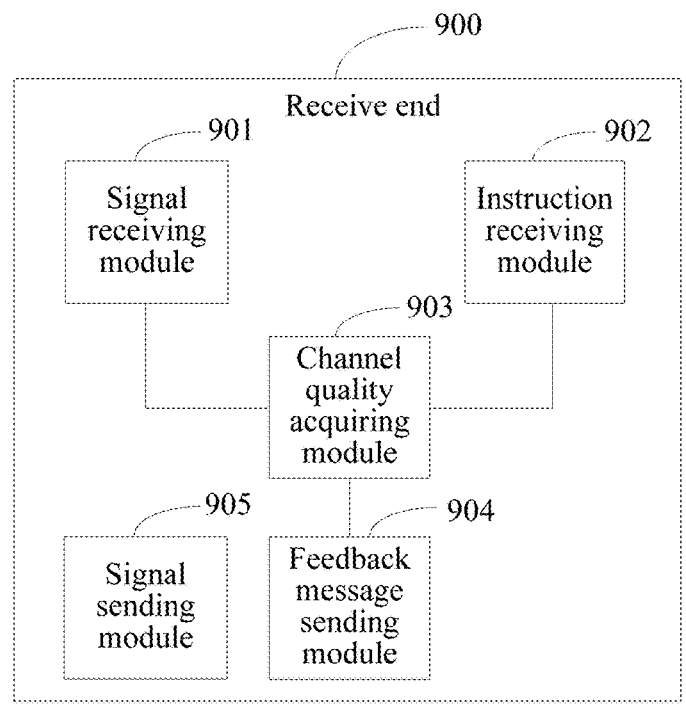
FIG. 10 is a schematic structural diagram of another receive end according to an embodiment of the present invention.

In still another optional implementation manner, as shown in FIG. 10, the receive end 900 may further include a signal sending module 905, configured to send a sounding reference signal to the transmit end, so that the transmit end determines a main beam and a multiplexing antenna beam of the receive end according to the sounding reference signal.

The RANK and the PMI point to a fourth restriction codebook matrix, and the fourth restriction codebook matrix is used for acquiring downlink channel quality of equivalent channels of the main beam and the multiplexing antenna beam after spatial multiplexing.

The channel quality acquiring module 903 is specifically configured to:

acquire the fourth restriction codebook matrix according to the RANK and the PMI; and acquire according to the mixed pilot signals, the fourth restriction codebook matrix, and the preset pilot signals, the downlink channel quality of the equivalent channel of the main beam and the downlink channel quality of the equivalent channel of the multiplexing antenna beam.

The feedback message sending module 904 is specifically configured to:

acquire a downlink CQI of the equivalent channel of the main beam according to the downlink channel quality of the equivalent channel of the main beam, and acquire a downlink CQI of the equivalent channel of the multiplexing antenna beam according to the downlink channel quality of the equivalent channel of the multiplexing antenna beam.

The channel quality feedback message fed back by the feedback message sending module 904 to the transmit end includes the downlink CQIs of the equivalent channels of the main beam and the multiplexing antenna beam, so that the transmit end determines, according to the downlink CQIs of the equivalent channels of the main beam and the multiplexing antenna beam, whether to use the main beam and the multiplexing antenna beam to serve the receive end.

It may be understood that, the functions of functional modules of the receive end 900 in this embodiment may be specifically implemented according to the methods in the following method embodiments, and reference may be specifically and correspondingly made to related description of the method embodiments in FIG. 12 to FIG. 17B, and details are not described herein again.

Figure 11:
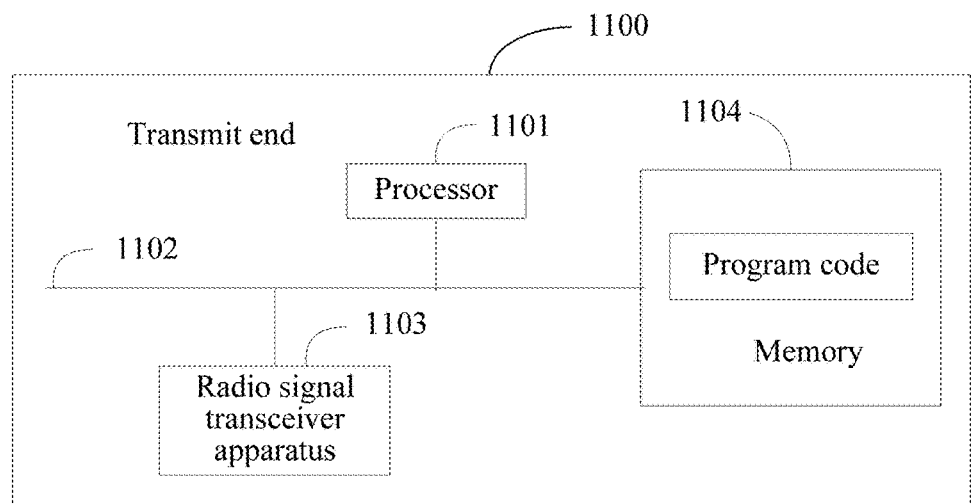
FIG. 11 is a schematic structural diagram of another receive end according to an embodiment of the present invention.

Referring to FIG. 11, FIG. 11 is a schematic structural diagram of a receive end provided in another embodiment of the present invention. As shown in FIG. 11, a receive end 1100 may include: at least one processor 1101, for example, a CPU, at least one communications bus 1102, a radio signal transceiver apparatus 1103, and a memory 1104. The radio signal transceiver apparatus 1103 includes a physical antenna, configured to receive a radio signal transmitted by a base station (that is, a transmit end) and transmit a radio signal to the base station. The communications bus 1102 is configured to implement connection and communication between these components. The memory 1104 may be a high-speed RAM memory, or may be a non-volatile memory, for example, at least one disk memory. The memory 1104 stores a group of program code, and the processor 1101 is configured to invoke the program code stored in the memory 1104 to execute the following operations:

receiving at least two mixed pilot signals transmitted by a transmit end by using at least two physical antennas, where the at least two mixed pilot signals are separately obtained after preset pilot signals corresponding to logical antennas in at least two logical antennas are weighted by using a precoding weight matrix;

receiving a first codebook subset restriction instruction sent by the transmit end, where the first codebook subset restriction instruction carries a rank indication RANK and at least one precoding matrix index PMI;

acquiring downlink channel quality of an equivalent channel of a specified antenna according to the mixed pilot signals, the first codebook subset restriction instruction, and the preset pilot signals; and feeding back a channel quality feedback message to the transmit end according to the downlink channel quality of the equivalent channel of the specified antenna.

In an optional implementation manner, the RANK and the PMI point to a first restriction codebook matrix, and the first restriction codebook matrix is used for acquiring downlink channel quality of equivalent channels of at least two auxiliary beam antennas after spatial multiplexing.

The acquiring, by the processor 1101, downlink channel quality of an equivalent channel of a specified antenna according to the mixed pilot signals, the first codebook subset restriction instruction, and the preset pilot signals may specifically be:

acquiring the first restriction codebook matrix according to the RANK and the PMI; and acquiring, according to the mixed pilot signals, the first restriction codebook matrix, and the preset pilot signals, the downlink channel quality of the equivalent channels of the at least two auxiliary beam antennas after spatial multiplexing.

The feeding back, by the processor 1101, a channel quality feedback message to the transmit end according to the downlink channel quality of the equivalent channel of the specified antenna may specifically be:

acquiring downlink CQIs of the equivalent channels of the at least two auxiliary beam antennas according to the downlink channel quality of the equivalent channels of the at least two auxiliary beam antennas.

The channel quality feedback message fed back to the transmit end includes the downlink CQIs of the equivalent channels of the at least two auxiliary beam antennas, so that the transmit end determines, according to the downlink CQIs of the equivalent channels of the at least two auxiliary beam antennas, whether to use any auxiliary beam antenna in the at least two auxiliary beam antennas to serve the receive end.

In another optional implementation manner, the first codebook subset restriction instruction carries at least two PMIs, the RANK and each PMI in the at least two PMIs separately point to at least two second restriction codebook matrices, and the at least two second restriction codebook matrices are separately used for acquiring downlink channel quality of equivalent channels of at least two auxiliary beam antennas.

The acquiring, by the processor 1101, downlink channel quality of an equivalent channel of a specified antenna according to the mixed pilot signals, the first codebook subset restriction instruction, and the preset pilot signals may specifically be:

acquiring the at least two second restriction codebook matrices separately according to the RANK and the at least two PMIs; and acquiring the downlink channel quality of the equivalent channels of the at least two auxiliary beam antennas according to the mixed pilot signals, the at least two second restriction codebook matrices, and the preset pilot signals.

The feeding back, by the processor 1101, a channel quality feedback message to the transmit end according to the downlink channel quality of the equivalent channel of the specified antenna may specifically be:

acquiring downlink CQIs of the equivalent channels of the at least two auxiliary beam antennas according to the downlink channel quality of the equivalent channels of the at least two auxiliary beam antennas; and determining a target auxiliary beam antenna from the at least two auxiliary beam antennas according to the downlink CQIs of the equivalent channels of the at least two auxiliary beam antennas.

The channel quality feedback message fed back to the transmit end includes a PMI of the target auxiliary beam antenna, so that the transmit end according to the PMI determine use the target auxiliary beam antenna to serve the receive end.

Furthermore, after the feeding back a channel quality feedback message to the transmit end according to the downlink channel quality of the equivalent channel of the specified antenna, the processor 1101 further executes the following operations:

receiving a second codebook subset restriction instruction sent by the transmit end, where a RANK and a PMI carried in the second codebook subset restriction instruction point to a third restriction codebook matrix, and the third restriction codebook matrix is used for acquiring downlink channel quality of equivalent channels of at least two macrocell antennas after spatial multiplexing;

acquiring the third restriction codebook matrix according to the RANK and the PMI;

acquiring, according to the mixed pilot signals, the third restriction codebook matrix, and the preset pilot signals, the downlink channel quality of the equivalent channels of the at least two macrocell antennas after spatial multiplexing;

acquiring downlink CQIs of the equivalent channels of the at least two macrocell antennas according to the downlink channel quality of the equivalent channels of the at least two macrocell antennas after spatial multiplexing; and feeding back the channel quality feedback message to the transmit end, where the channel quality feedback message includes the downlink CQIs of the equivalent channels of the at least two macrocell antennas, so that the transmit end determines, according to the downlink CQIs of the equivalent channels of the at least two macrocell antennas, whether to use any macrocell antenna in the at least two macrocell antennas to serve the receive end.

Furthermore, before the receiving a first codebook subset restriction instruction sent by the transmit end, the processor 1101 may further execute the following operation:

transmitting a sounding reference signal to the transmit end, so that the transmit end determines, according to the sounding reference signal, that the receive end meets an initial condition of using any auxiliary beam antenna in the at least two auxiliary beam antennas.

In another optional implementation manner, before the receiving a first codebook subset restriction instruction sent by the transmit end, the processor 1101 further executes the following operation:

sending a sounding reference signal to the transmit end, so that the transmit end determines a main beam and a multiplexing antenna beam of the receive end according to the sounding reference signal.

The RANK and the PMI point to a fourth restriction codebook matrix, and the fourth restriction codebook matrix is used for acquiring downlink channel quality of equivalent channels of the main beam and the multiplexing antenna beam after spatial multiplexing.

The feeding back, by the processor 1101, a channel quality feedback message to the transmit end according to the downlink channel quality of the equivalent channel of the specified antenna may specifically be:

acquiring the fourth restriction codebook matrix according to the RANK and the PMI; and acquiring, according to the mixed pilot signals, the fourth restriction codebook matrix, and the preset pilot signals, the downlink channel quality of the equivalent channel of the main beam and the downlink channel quality of the equivalent channel of the multiplexing antenna beam.

The feeding back, by the processor 1101, a channel quality feedback message to the transmit end according to the downlink channel quality of the equivalent channel of the specified antenna may specifically be:

acquiring a downlink CQI of the equivalent channel of the main beam according to the downlink channel quality of the equivalent channel of the main beam, and acquiring a downlink CQI of the equivalent channel of the multiplexing antenna beam according to the downlink channel quality of the equivalent channel of the multiplexing antenna beam.

The channel quality feedback message fed back to the transmit end includes the downlink CQIs of the equivalent channels of the main beam and the multiplexing antenna beam, so that the transmit end determines, according to the downlink CQIs of the equivalent channels of the main beam and the multiplexing antenna beam, whether to use the main beam and the multiplexing antenna beam to serve the receive end.

It may be understood that, the functions of functional modules of the receive end 1100 in this embodiment may be specifically implemented according to the methods in the following method embodiments, and reference may be specifically and correspondingly made to related description of the method embodiments in FIG. 12 to FIG. 17B, and details are not described herein again.

Figure 12:
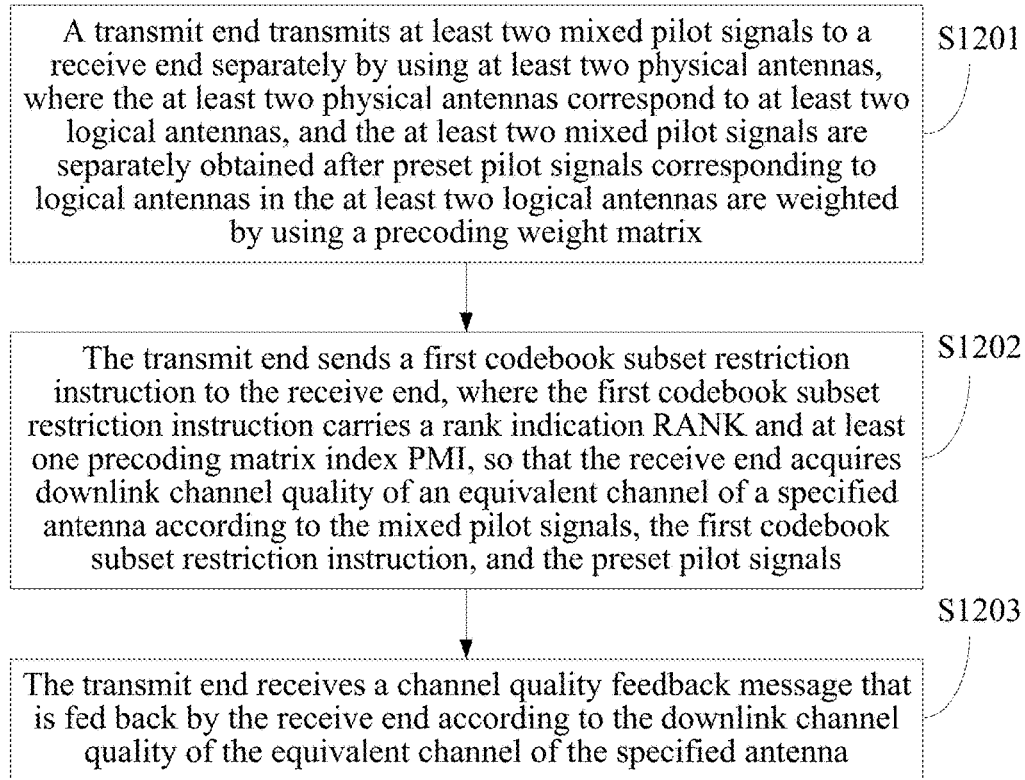
FIG. 12 is a schematic flowchart of a method for measuring downlink channel quality according to an embodiment of the present invention.

Referring to FIG. 12, FIG. 12 is a schematic flowchart of a method for measuring downlink channel quality provided in an embodiment of the present invention. A transmit end provided in this embodiment of the present invention includes an indoor base station or an outdoor base station. As shown in FIG. 12, a procedure of measuring downlink channel quality in this embodiment may include:

Step S1201: A transmit end transmits at least two mixed pilot signals to a receive end separately by using at least two physical antennas, where the at least two physical antennas correspond to at least two logical antennas, and the at least two mixed pilot signals are separately obtained after preset pilot signals corresponding to logical antennas in the at least two logical antennas are weighted by using a precoding weight matrix.

It is assumed that a specific value of the precoding weight matrix $\Gamma$ is shown in a matrix (2). Preset pilot signals corresponding to logical antennas Port15, Port16, Port17 and Port18 are respectively $S_{Port15}$, $S_{Port16}$, $S_{Port17}$, $S_{Port18}$, and mixed pilot signals after the preset pilot signals are weighted by using the precoding weight matrix may be shown in a matrix (3). If a correspondence between a physical antenna and a logical antenna is that: beam0 corresponds to Port15, beam1 corresponds to Port15, macro0 corresponds to Port17, and macro1 corresponds to Port18, mixed pilot signals corresponding to the physical antennas are separately as follows: beam0 corresponds to a first-column mixed pilot signal, beam1 corresponds to a second-column mixed pilot signal, macro0 corresponds to a third-column mixed pilot signal, and macro1 corresponds to a fourth-column mixed pilot signal.

$$\frac{1}{p}\begin{bmatrix} 1 & 1 & 1 & 1 \\ 1 & 1 & -1 & -1 \\ 1 & -1 & 1 & -1 \\ 1 & -1 & -1 & 1 \end{bmatrix} \quad (2)$$

$$\begin{bmatrix} S_{Port15} & S_{Port16} & S_{Port17} & S_{Port18} \\ S_{Port15} & S_{Port16} & -S_{Port17} & -S_{Port18} \\ S_{Port15} & -S_{Port16} & S_{Port17} & -S_{Port18} \\ S_{Port15} & -S_{Port16} & -S_{Port17} & S_{Port18} \end{bmatrix} \quad (3)$$

Specifically, the transmit end may generate a mixed pilot signal in advance. Next, the transmit end controls, at intervals of a preset period, for example, 5 ms, physical antennas of the transmit end to separately transmit mixed pilot signals corresponding to the physical antennas. The transmit end may also generate mixed pilot signals at intervals of a preset period, and then separately transmit, by using the physical antennas of the transmit end, mixed pilot signals corresponding to the physical antennas.

The transmit end and the receive end may store the preset pilot signals in advance. The preset pilot signals stored by the receive end may be generated by the receive end as indicated by the transmit end.

Step S1202: The transmit end sends a first codebook subset restriction instruction to the receive end, where the first codebook subset restriction instruction carries a rank indication RANK and at least one precoding matrix index PMI, so that the receive end acquires downlink channel quality of an equivalent channel of a specified antenna according to the mixed pilot signals, the first codebook subset restriction instruction, and the preset pilot signals.

The transmit end and the receive end may configure multiple restriction codebook matrices in advance. The receive end may acquire the equivalent channel of the specified antenna according to a restriction codebook matrix, and the restriction codebook matrix is determined by a RANK and a PMI. The RANK represents a quantity of independent virtual channels. For example, for a 4-input-2-output antenna system, in different channel environments, a quantity of layers of antennas may be 1 or 2 and at most does not exceed a minimum value of quantities of antennas at a receive end and a transmit end, that is, the maximum value of the RANK is 2.

Specifically, the transmit end may send a first codebook subset restriction instruction to the receive end, where the first codebook subset restriction instruction carries a RANK and at least one PMI, so that the receive end acquires, according to the RANK and the PMI, a restriction codebook matrix corresponding to the PMI, acquires the equivalent channel of the specified antenna according to the restriction codebook matrix and the at least two mixed pilot signals, and acquires a pilot removal sequence according to the preset pilot signals. The receive end then removes preset pilot signals of the equivalent channel of the specified antenna according to the pilot removal sequence, so as to acquire the downlink channel quality of the equivalent channel of the specified antenna.

The transmit end separately weights the preset pilot signals corresponding to the at least two logical antennas by using the precoding weight matrix and then maps the preset pilot signals to physical antennas, and the preset pilot signals are then transmitted by using the at least two physical antennas. A signal receiving model equivalent to the receive end may be expressed as:

$$Y = H\Gamma S_{CSI} + N = \begin{bmatrix} h^0_{Beam0} & h^0_{Beam1} & h^0_{Macro0} & H^0_{Macro1} \\ h^1_{Beam0} & h^1_{Beam1} & h^1_{Macro0} & h^1_{Macro1} \end{bmatrix} \Gamma \begin{bmatrix} S_{Beam0} \\ S_{Beam1} \\ S^{Ant0}_{Macro} \\ S^{Ant1}_{Macro} \end{bmatrix} + N$$

where H is an equivalent channel from the transmit end to the receive end, a superscript of h is a receive antenna of the receive end, and a subscript of h is a transmit antenna of the transmit end, $\Gamma$ is the precoding weight matrix, and $S_{CSI}$ is a preset pilot signal corresponding to each logical antenna of the transmit end.

The receive end may use a restriction codebook matrix to acquire the equivalent channel of the specified antenna, and an expression of the equivalent channel of the specified antenna is: $H_{eff}=H\Gamma W$, where W is a restriction codebook matrix.

If the receive end wants to acquire equivalent channels of some physical antennas (for example, two physical antennas), $\Gamma W$ needs to meet a relationship similar to the following:

$$\Gamma W = \begin{bmatrix} \tau_0 \\ \tau_1 \\ \tau_2 \\ \tau_3 \end{bmatrix} [w_0 \ w_1] = \begin{bmatrix} \tau_0 w_0 & \tau_0 w_1 \\ \tau_1 w_0 & \tau_1 w_1 \\ \tau_2 w_0 & \tau_2 w_1 \\ \tau_3 w_0 & \tau_3 w_1 \end{bmatrix} = \begin{bmatrix} 1 & 0 \\ 0 & 1 \\ 0 & 0 \\ 0 & 0 \end{bmatrix}$$

For a final column vector of a matrix $\Gamma W$, each column has one non-zero element, and row vector indices of two non-zero elements must be different. Therefore, $\tau_0 = w_0^H$ and $\tau_1 = w_1^H$ exist, and $\tau_2$ and $\tau_3$ must both be orthogonal vectors of $w_0$ and $w_1$, while $\tau_2$ and $\tau_3$ are not necessarily orthogonal.

If the receive end wants to acquire an equivalent channel of a particular single-output physical antenna, $\Gamma W$ needs to meet a relationship similar to the following:

$$\Gamma W = \begin{bmatrix} \tau_0 \\ \tau_1 \\ \tau_2 \\ \tau_3 \end{bmatrix} w_0 = \begin{bmatrix} \tau_0 w_0 \\ \tau_1 w_0 \\ \tau_2 w_0 \\ \tau_3 w_0 \end{bmatrix} = \begin{bmatrix} 1 \\ 0 \\ 0 \\ 0 \end{bmatrix}$$

where $\tau_0 = w_0^H$, $\tau_1$, $\tau_2$, and $\tau_3$ must be orthogonal vectors of $w_0$, and $\tau_2$ and $\tau_3$ are not necessarily orthogonal.

That is, the receive end may use a specified restriction codebook matrix to acquire the equivalent channel of the specified antenna.

If the RANK and the PMI carried in the first codebook subset restriction instruction point to a first restriction codebook matrix, as shown in a matrix (4), the equivalent channel acquired by the receive end is:

$$\frac{1}{2\sqrt{2}} \begin{bmatrix} 1 & 1 \\ 1 & 1 \\ -1 & 1 \\ -1 & 1 \end{bmatrix} \quad (4)$$

$$H_{eff} = H\Gamma W_8 = \begin{bmatrix} h^0_{Beam0} & h^0_{Beam1} & h^0_{Macro0} & h^0_{Macro1} \\ h^1_{Beam0} & h^1_{Beam1} & h^1_{Macro0} & h^1_{Macro1} \end{bmatrix}$$

$$\frac{1}{\sqrt{2}} \begin{bmatrix} 1 & 1 & 1 & 1 \\ 1 & 1 & -1 & -1 \\ 1 & -1 & 1 & -1 \\ 1 & -1 & -1 & 1 \end{bmatrix} *$$

$$\frac{1}{2\sqrt{2}} \begin{bmatrix} 1 & 1 \\ 1 & 1 \\ -1 & 1 \\ -1 & 1 \end{bmatrix} = \begin{bmatrix} h^0_{Beam0} & h^0_{Beam1} & h^0_{Macro0} & h^0_{Macro1} \\ h^1_{Beam0} & h^1_{Beam1} & h^1_{Macro0} & h^1_{Macro1} \end{bmatrix} \begin{bmatrix} 0 & 1 \\ 1 & 0 \\ 0 & 0 \\ 0 & 0 \end{bmatrix}$$

$$= \begin{bmatrix} h^0_{Beam0} & h^0_{Beam0} \\ h^1_{Beam1} & h^1_{Beam0} \end{bmatrix}$$

That is, the receive end may acquire, according to the first restriction codebook matrix, equivalent channels of auxiliary beam antennas beam0 and beam1 after spatial multiplexing.

If the first codebook subset restriction instruction carries two PMIs, the RANK and one PMI point to one second restriction codebook matrix, as shown in a matrix (5), and the RANK and the other PMI point to another second restriction codebook matrix, as shown in a matrix (6). Therefore, expressions of the equivalent channels separately acquired by the receive end are:

$$\frac{1}{2} \begin{bmatrix} 1 \\ 1 \\ 1 \\ 1 \end{bmatrix} \quad (5)$$

$$\frac{1}{2} \begin{bmatrix} 1 \\ 1 \\ -1 \\ -1 \end{bmatrix} \quad (6)$$

$$H^{Pmi0}_{eff} = H\Gamma W_0 = \begin{bmatrix} h^0_{Beam0} & h^0_{Beam1} & h^0_{Macro0} & h^0_{Macro1} \\ h^1_{Beam0} & h^1_{Beam1} & h^1_{Macro0} & h^1_{Macro1} \end{bmatrix}$$

$$\frac{1}{\sqrt{2}} \begin{bmatrix} 1 & 1 & 1 & 1 \\ 1 & 1 & -1 & -1 \\ 1 & -1 & 1 & -1 \\ 1 & -1 & -1 & 1 \end{bmatrix} * \frac{1}{2} \begin{bmatrix} 1 \\ 1 \\ 1 \\ 1 \end{bmatrix} =$$

$$\sqrt{2} \begin{bmatrix} h^0_{Beam0} & h^0_{Beam1} & h^0_{Macro0} & h^0_{Macro1} \\ h^1_{Beam0} & h^1_{Beam1} & h^1_{Macro0} & h^1_{Macro1} \end{bmatrix} \begin{bmatrix} 1 \\ 0 \\ 0 \\ 0 \end{bmatrix} = \sqrt{2} \begin{bmatrix} h^0_{Beam0} \\ h^1_{Beam0} \end{bmatrix}$$

$$H^{Pmi8}_{eff} = H\Gamma W_8 = \begin{bmatrix} h^0_{Beam0} & h^0_{Beam1} & h^0_{Macro0} & h^0_{Macro1} \\ h^1_{Beam0} & h^1_{Beam1} & h^1_{Macro0} & h^1_{Macro1} \end{bmatrix}$$

$$\frac{1}{\sqrt{2}} \begin{bmatrix} 1 & 1 & 1 & 1 \\ 1 & 1 & -1 & -1 \\ 1 & -1 & 1 & -1 \\ 1 & -1 & -1 & 1 \end{bmatrix} * \frac{1}{2} \begin{bmatrix} 1 \\ 1 \\ -1 \\ -1 \end{bmatrix} =$$

$$\sqrt{2} \begin{bmatrix} h^0_{Beam0} & h^0_{Beam1} & h^0_{Macro0} & h^0_{Macro1} \\ h^1_{Beam0} & h^1_{Beam1} & h^1_{Macro0} & h^1_{Macro1} \end{bmatrix} \begin{bmatrix} 0 \\ 1 \\ 0 \\ 0 \end{bmatrix} = \sqrt{2} \begin{bmatrix} h^0_{Beam1} \\ h^1_{Beam1} \end{bmatrix}$$

That is, the receive end may acquire the equivalent channel of the auxiliary beam antenna beam0 according to the matrix (5), and may acquire the equivalent channel of the auxiliary beam antenna beam1 according to the matrix (6).

Step S1203: The transmit end receives a channel quality feedback message that is fed back by the receive end according to the downlink channel quality of the equivalent channel of the specified antenna.

In an optional implementation manner, the channel quality feedback message may include downlink CQIs (channel quality indication, channel quality indicator) of equivalent channels of at least two auxiliary beam antennas after spatial multiplexing. Specifically, the receive end may acquire the downlink CQIs of the equivalent channels of the at least two auxiliary beam antennas according to downlink channel quality of the equivalent channels of the at least two auxiliary beam antennas after spatial multiplexing, and then feed back the downlink CQIs of the equivalent channels of the at least two auxiliary beam antennas to the transmit end by using the channel quality feedback message.

In another optional implementation manner, the channel quality feedback message may further include a PMI of a target auxiliary beam antenna. Specifically, the receive end may acquire downlink CQIs of the equivalent channels of the at least two auxiliary beam antennas according to downlink channel quality of equivalent channels of at least two auxiliary beam antennas, then determine an auxiliary beam antenna corresponding to a maximum value of a downlink CQI as the target auxiliary beam antenna, and feed back, to the transmit end by using the channel quality feedback message, the PMI corresponding to the target auxiliary beam antenna.

Furthermore, the channel quality feedback message may further include downlink CQIs of equivalent channels of at least two macrocell antennas after spatial multiplexing. Specifically, the receive end may acquire, according to the downlink channel quality of the equivalent channels of the at least two macrocell antennas after spatial multiplexing, the downlink CQIs of the equivalent channels of the at least two macrocell antennas, and then feed back, to the transmit end by using the channel quality feedback message, the downlink CQIs of the equivalent channels of the at least two macrocell antennas.

In still another optional implementation manner, the channel quality feedback message may include a downlink CQI of an equivalent channel of a main beam and a downlink CQI of an equivalent channel of a multiplexing antenna beam.

In the implementation of this embodiment of the present invention, a transmit end may transmit at least two mixed pilot signals and a codebook subset restriction instruction to a receive end separately by using at least two physical antennas, where the at least two mixed pilot signals are separately obtained after preset pilot signals corresponding to logical antennas in at least two logical antennas are weighted by using a precoding weight matrix, so that the receive end acquires downlink channel quality of an equivalent channel of a specified antenna according to the received mixed pilot signals, the codebook subset restriction instruction, and the preset pilot signals, and feeds back the downlink channel quality of the equivalent channel of the specified antenna to the transmit end, and the transmit end may accurately acquire the downlink channel quality of the equivalent channel of the specified antenna.

Figure 13:
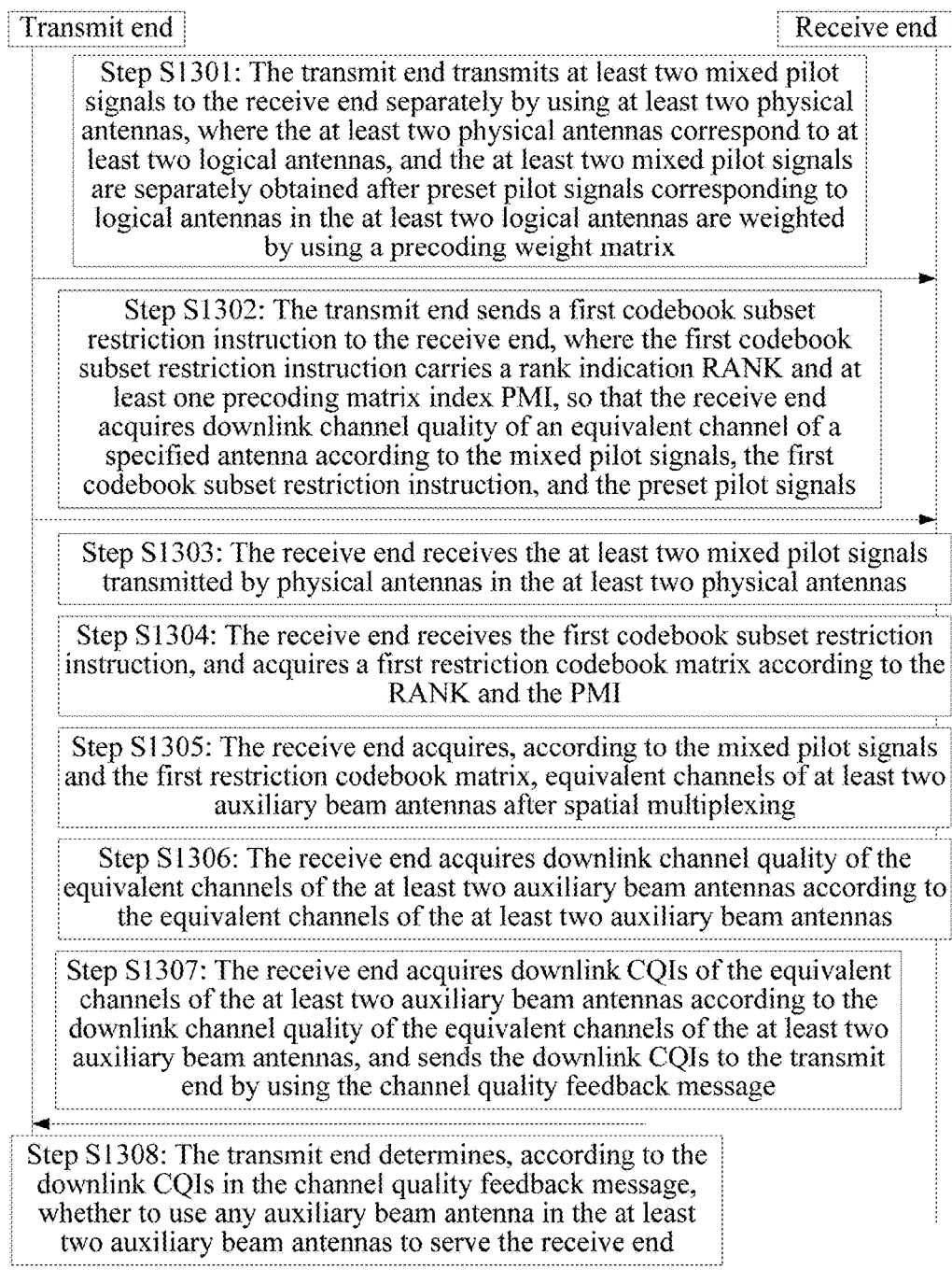
FIG. 13 is a schematic flowchart of a beam selection method according to an embodiment of the present invention.

Referring to FIG. 13, FIG. 13 is a schematic flowchart of a beam selection method provided in an embodiment of the present invention. The beam selection method provided in this embodiment of the present invention is described from the perspective of a receive end and a transmit end, the transmit end is an outdoor base station, and the receive end may include a terminal such as a mobile phone, a PAD or a notebook computer. The beam select procedure provided in this embodiment may include:

Step S1301: A transmit end transmits at least two mixed pilot signals to a receive end separately by using at least two physical antennas, where the at least two physical antennas correspond to at least two logical antennas, and the at least two mixed pilot signals are separately obtained after preset pilot signals corresponding to logical antennas in the at least two logical antennas are weighted by using a precoding weight matrix.

Step S1302: The transmit end sends a first codebook subset restriction instruction to the receive end, where the first codebook subset restriction instruction carries a rank indication RANK and at least one precoding matrix index PMI, so that the receive end acquires downlink channel quality of an equivalent channel of a specified antenna according to the mixed pilot signals, the first codebook subset restriction instruction, and the preset pilot signals.

Optionally, before the transmit end sends the first codebook subset restriction instruction to the receive end, the transmit end may separately receive a sounding reference signal of the receive end by using the at least two physical antennas, and acquire receive power of the at least two physical antennas separately for the receive end according to the sounding reference signal received within a second preset period of time, and the transmit end then determines, according to the receive power of the at least two physical antennas separately for the receive end, that the receive end meets an initial condition of using an auxiliary beam antenna.

In specific implementation, the receive end may periodically send a sounding reference signal. Each physical antenna in the at least two physical antennas of the transmit end may receive the sounding reference signal of the receive end, and the transmit end may use signal strength of sounding reference signals received a last time by physical antennas as receive power of the physical antennas for the receive end separately. The receive end may also obtain a statistical average of signal strength of sounding reference signals received by the physical antennas within a second preset period of time, and use a result of the statistical average as receive power of the physical antennas for the receive end separately. If the transmit end determines, according to the receive power, that the receive end meets an initial condition of using an auxiliary beam antenna, the transmit end sends the first codebook subset restriction instruction to the receive end; otherwise, the transmit end determines to use a macrocell antenna to serve the receive end, thereby improving efficiency of beam selection.

Step S1303: The receive end receives the at least two mixed pilot signals transmitted by physical antennas in the at least two physical antennas.

The receive end detects a common pilot channel in real time, and if the mixed pilot signals are detected, the receive end receives the mixed pilot signals.

It should be noted that a sequence of step S1303 and step S1302 may be not limited, that is, step S1303 may also be executed before step S1302, and step S1403 and step S1402 may also be executed at the same time, which is not limited in the present invention.

Step S1304: The receive end receives the first codebook subset restriction instruction, and acquires a first restriction codebook matrix according to the RANK and the PMI.

The receive end and the transmit end may store a correspondence between a RANK and PMI and a restriction codebook matrix in advance. When receiving the first codebook subset restriction instruction, the receive end may acquire, from the correspondence, a first restriction codebook matrix pointed to by the RANK and the PMI. If the precoding weight matrix is shown by a matrix (2), the first restriction codebook matrix may be shown by a matrix (4), where a correspondence between a RANK and PMI and a restriction codebook matrix should also be the same in both the transmit end and the receive end.

Step S1305: The receive end acquires, according to the mixed pilot signals and the first restriction codebook matrix, equivalent channels of at least two auxiliary beam antennas after spatial multiplexing.

If the first restriction codebook matrix is shown by the matrix (4), the equivalent channel acquired by the receive end is:

$$H_{eff} = H\Gamma W_8 = \begin{bmatrix} h^0_{Beam0} & h^0_{Beam1} & h^0_{Macro0} & h^0_{Macro1} \\ h^1_{Beam0} & h^1_{Beam1} & h^1_{Macro0} & h^1_{Macro1} \end{bmatrix}$$

$$\frac{1}{\sqrt{2}}\begin{bmatrix} 1 & 1 & 1 & 1 \\ 1 & 1 & -1 & -1 \\ 1 & -1 & 1 & -1 \\ 1 & -1 & -1 & 1 \end{bmatrix} * \frac{1}{2\sqrt{2}}\begin{bmatrix} 1 & 1 \\ 1 & 1 \\ -1 & 1 \\ -1 & 1 \end{bmatrix} =$$

$$\begin{bmatrix} h^0_{Beam0} & h^0_{Beam1} & h^0_{Macro0} & h^0_{Macro1} \\ h^1_{Beam0} & h^1_{Beam1} & h^1_{Macro0} & h^1_{Macro1} \end{bmatrix}\begin{bmatrix} 0 & 1 \\ 1 & 0 \\ 0 & 0 \\ 0 & 0 \end{bmatrix} = \begin{bmatrix} h^0_{Beam1} & h^0_{Beam0} \\ h^1_{Beam1} & h^1_{Beam0} \end{bmatrix}$$

Step S1306: The receive end acquires downlink channel quality of the equivalent channels of the at least two auxiliary beam antennas according to the equivalent channels of the at least two auxiliary beam antennas.

Specifically, the receive end may acquire a corresponding pilot removal sequence according to preset pilot signals corresponding to auxiliary beam antennas in the at least two auxiliary beam antennas, and the receive end may remove, according to the pilot removal sequence, mixed pilot signals in the acquired equivalent channels, so as to obtain the downlink channel quality of the equivalent channels of the auxiliary beam antennas.

Step S1307: The receive end acquires downlink CQIs of the equivalent channels of the at least two auxiliary beam antennas according to the downlink channel quality of the equivalent channels of the at least two auxiliary beam antennas, and sends the downlink CQIs to the transmit end by using the channel quality feedback message.

Specifically, the receive end may acquire signal-to-interference-plus-noise ratios of the equivalent channels of the auxiliary beam antennas according to the downlink channel quality of the equivalent channels of the auxiliary beam antennas, and may acquire the downlink CQIs of the equivalent channels of the auxiliary beam antennas according to the Shannon's equation. The receive end then sends the downlink CQIs of the equivalent channels of the auxiliary beam antennas to the transmit end by using the channel quality feedback message.

Step S1308: The transmit end determines, according to the downlink CQIs in the channel quality feedback message, whether to use any auxiliary beam antenna in the at least two auxiliary beam antennas to serve the receive end.

Preferably, if a downlink CQI greater than a first preset threshold exists in the downlink CQIs of the equivalent channels of the auxiliary beam antennas, the transmit end determines to use any auxiliary beam antenna in the at least two auxiliary beam antennas to serve the receive end.

Optionally, if the downlink CQIs of the equivalent channels of the auxiliary beam antennas are all greater than the first preset threshold, the transmit end determines to use any auxiliary beam antenna in the at least two auxiliary beam antennas to serve the receive end.

Furthermore, if the transmit end determines to use an auxiliary beam antenna to serve the receive end, the transmit end may determine, according to the downlink CQIs of the equivalent channels of the auxiliary beam antennas, a target auxiliary beam antenna in the auxiliary beam antennas to serve the receive end.

The target auxiliary beam antenna may be an auxiliary beam antenna corresponding to a maximum downlink CQI, or may be any auxiliary beam antenna.

In this embodiment of the present invention, when a transmit end needs to acquire downlink CQIs of equivalent channels of auxiliary beam antennas after spatial multiplexing, the transmit end may send, to a receive end, a first codebook subset restriction instruction carrying a PMI and a RANK. The PMI and the RANK point to a first restriction codebook matrix, so that the receive end may acquire downlink channel quality of the equivalent channels of the auxiliary beam antennas according to the received mixed pilot signals, the first restriction codebook matrix, and preset pilot signals and feed back the downlink channel quality of the equivalent channels of the auxiliary beam antennas to the transmit end. The transmit end may determine, according to the downlink CQIs of the equivalent channels of the auxiliary beam antennas, whether to use any auxiliary beam antenna in the auxiliary beam antennas to serve the receive end, so that the transmit end can select a suitable serve beam for the receive end, thereby improving signal quality.

Figure 14A:
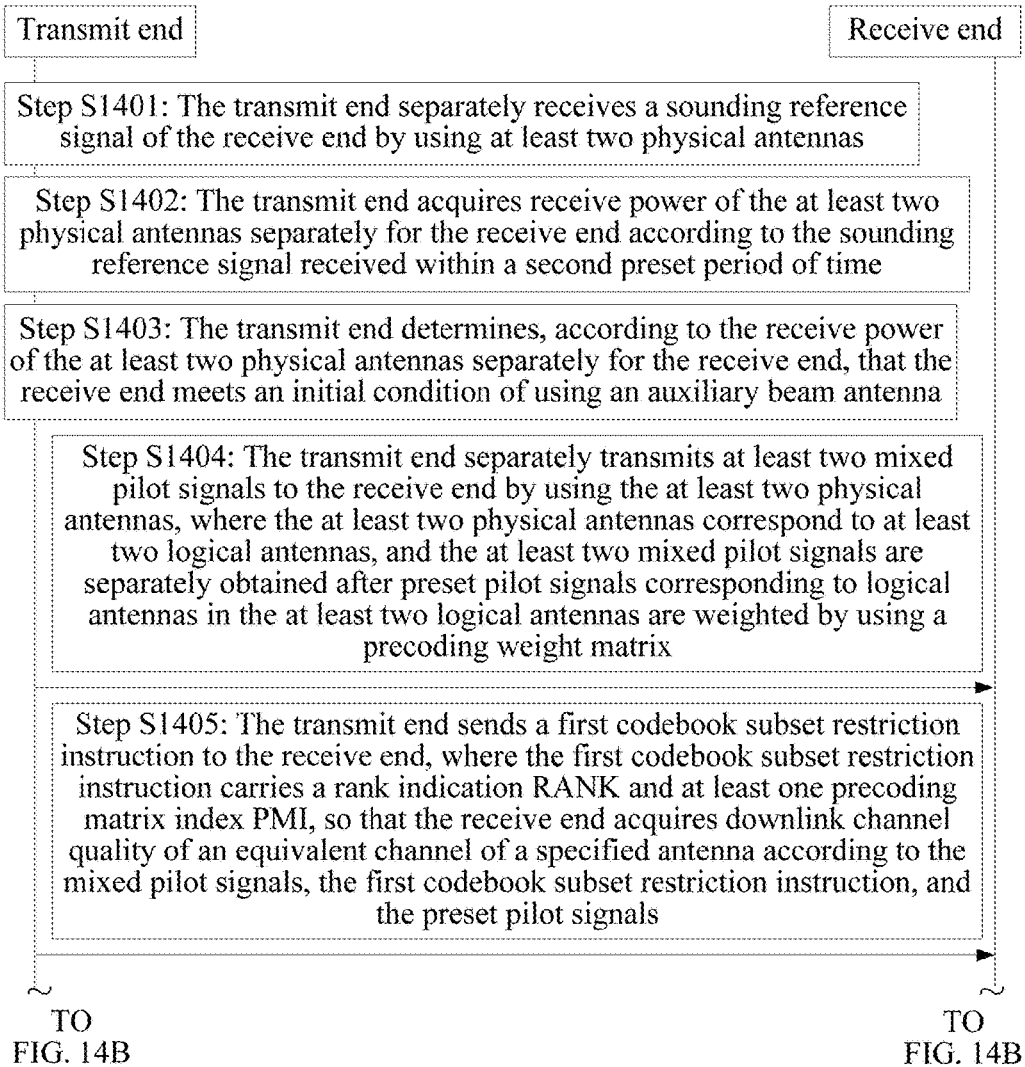

Referring to FIG. 14A and FIG. 14B, FIG. 14A and FIG. 14B are a schematic flowchart of another beam selection method provided in an embodiment of the present invention. The beam selection method provided in this embodiment of the present invention is described from the perspective of a receive end and a transmit end, the transmit end is an outdoor base station, and the receive end may include a terminal such as a mobile phone, a PAD or a notebook computer. A procedure of beam selection provided in this embodiment may include:

Step S1401: A transmit end separately receives a sounding reference signal of a receive end by using the at least two physical antennas.

Step S1402: The transmit end acquires receive power of the at least two physical antennas separately for the receive end according to the sounding reference signal received within a second preset period of time.

The receive end may periodically send a sounding reference signal. The transmit end may use signal strength of sounding reference signals received a last time by physical antennas in the at least two physical antennas as receive power of the physical antennas for the receive end separately. The receive end may also obtain a statistical average of signal strength of sounding reference signals received by the physical antennas within a second preset period of time, and use a result of the statistical average as receive power of the physical antennas for the receive end separately.

Step S1403: The transmit end determines, according to the receive power of the at least two physical antennas separately for the receive end, that the receive end meets an initial condition of using an auxiliary beam antenna.

If a difference value between receive power received by Beam0 for the receive end and receive power received by Beam1 for the receive end meets a first preset power threshold value, and/or a difference value between receive power received by any auxiliary beam antenna for the receive end and receive power received by any macrocell antenna for the receive end meets a second preset power threshold value, the transmit end determines that the receive end meets an initial condition of using the auxiliary beam antenna.

It should be noted that, in this embodiment of the present invention, step S1404 is executed when the transmit end determines that the receive end meets an initial condition of using an auxiliary beam antenna, and in other optional embodiments, the transmit end may directly execute step S1404.

Step S1404: The transmit end separately transmits at least two mixed pilot signals to the receive end by using the at least two physical antennas, where the at least two physical antennas correspond to at least two logical antennas, and the at least two mixed pilot signals are separately obtained after preset pilot signals corresponding to logical antennas in the at least two logical antennas are weighted by using a precoding weight matrix.

Step S1405: The transmit end sends a first codebook subset restriction instruction to the receive end, where the first codebook subset restriction instruction carries a rank indication RANK and at least one precoding matrix index PMI, so that the receive end acquires downlink channel quality of an equivalent channel of a specified antenna according to the mixed pilot signals, the first codebook subset restriction instruction, and the preset pilot signals.

Step S1406: The receive end receives the at least two mixed pilot signals transmitted by the at least two physical antennas.

The receive end detects a common pilot channel in real time, and if the mixed pilot signals are detected, the receive end receives the mixed pilot signals.

Step S1407: The receive end receives the first codebook subset restriction instruction, and acquires separately, according to the RANK and PMIs, at least two second restriction codebook matrices corresponding to the PMIs.

An example in which the first codebook subset restriction instruction carries two PMIs is used as an example. The receive end and the transmit end may store a correspondence between a RANK and PMI and a restriction codebook matrix in advance. When receiving the first codebook subset restriction instruction, the receive end acquires one second restriction codebook matrix according to the RANK and one PMI, and acquires another second restriction codebook matrix according to the RANK and the other PMI. If the precoding weight matrix is shown by a matrix (2), the two second restriction codebook matrices may be shown by a matrix (5) and a matrix (6), where a correspondence between a RANK and PMI and a restriction codebook matrix should also be the same in both the transmit end and the receive end.

Step S1408: The receive end separately acquires equivalent channels of auxiliary beam antennas according to the received mixed pilot signals and the at least two second restriction codebook matrices.

If the second restriction codebook matrix is shown by the matrix (5), the equivalent channel acquired by the receive end is:

$$H_{eff}^{Pmi0} = H\Gamma W_0 = \begin{bmatrix} h^0_{Beam0} & h^0_{Beam1} & h^0_{Macro0} & h^0_{Macro1} \\ h^1_{Beam0} & h^1_{Beam1} & h^1_{Macro0} & h^1_{Macro1} \end{bmatrix}$$

$$\frac{1}{\sqrt{2}} \begin{bmatrix} 1 & 1 & 1 & 1 \\ 1 & 1 & -1 & -1 \\ 1 & -1 & 1 & -1 \\ 1 & -1 & -1 & 1 \end{bmatrix} * \frac{1}{2} \begin{bmatrix} 1 \\ 1 \\ 1 \\ 1 \end{bmatrix} =$$

$$\sqrt{2} \begin{bmatrix} h^0_{Beam0} & h^0_{Beam1} & h^0_{Macro0} & h^0_{Macro1} \\ h^1_{Beam0} & h^1_{Beam1} & h^1_{Macro0} & h^1_{Macro1} \end{bmatrix} \begin{bmatrix} 1 \\ 0 \\ 0 \\ 0 \end{bmatrix} = \sqrt{2} \begin{bmatrix} h^0_{Beam0} \\ h^1_{Beam0} \end{bmatrix}.$$

If the second restriction codebook matrix is shown by the matrix (6), the equivalent channel acquired by the receive end is:

$$H_{eff}^{Pmi8} = H\Gamma W_8 = \begin{bmatrix} h^0_{Beam0} & h^0_{Beam1} & h^0_{Macro0} & h^0_{Macro1} \\ h^1_{Beam0} & h^1_{Beam1} & h^1_{Macro0} & h^1_{Macro1} \end{bmatrix}$$

$$\frac{1}{\sqrt{2}} \begin{bmatrix} 1 & 1 & 1 & 1 \\ 1 & 1 & -1 & -1 \\ 1 & -1 & 1 & -1 \\ 1 & -1 & -1 & 1 \end{bmatrix} * \frac{1}{2} \begin{bmatrix} 1 \\ 1 \\ -1 \\ -1 \end{bmatrix} =$$

$$\sqrt{2} \begin{bmatrix} h^0_{Beam0} & h^0_{Beam1} & h^0_{Macro0} & h^0_{Macro1} \\ h^1_{Beam0} & h^1_{Beam1} & h^1_{Macro0} & h^1_{Macro1} \end{bmatrix} \begin{bmatrix} 0 \\ 1 \\ 0 \\ 0 \end{bmatrix} = \sqrt{2} \begin{bmatrix} h^0_{Beam1} \\ h^1_{Beam1} \end{bmatrix}.$$

That is, the receive end may acquire equivalent channels of an auxiliary beam antenna beam0 and an auxiliary beam antenna beam1 according to the two second restriction codebook matrices separately.

Step S1409: The receive end separately acquires, according to equivalent channels of at least two auxiliary beam antennas, downlink channel quality of the equivalent channels of the auxiliary beam antennas.

Specifically, the receive end may acquire a corresponding pilot removal sequence according to a preset pilot signal corresponding to an auxiliary beam antenna beam0, and the receive end may remove a mixed pilot signal in an equivalent channel of beam0 according to the pilot removal sequence, so as to obtain downlink channel quality of the equivalent channel of the auxiliary beam antenna beam0. The receive end may acquire a corresponding pilot removal sequence according to the preset pilot signal corresponding to the auxiliary beam antenna beam1, and the receive end may remove a mixed pilot signal in an equivalent channel of beam1 according to the pilot removal sequence, so as to obtain downlink channel quality of the equivalent channel of the auxiliary beam antenna beam1.

Step S1410: The receive end acquires downlink CQIs of the equivalent channels of the at least two auxiliary beam antennas according to the downlink channel quality of the equivalent channels of the at least two auxiliary beam antennas.

Specifically, the receive end may acquire signal-to-interference-plus-noise ratios of the equivalent channels of the auxiliary beam antennas according to the downlink channel quality of the equivalent channels of the auxiliary beam antennas, and may acquire the downlink CQIs of the equivalent channels of the auxiliary beam antennas according to a Shannon's equation.

Step S1411: The receive end determines an auxiliary beam antenna corresponding to a maximum downlink CQI as a target auxiliary beam antenna, and sends a PMI corresponding to the target auxiliary beam antenna to the transmit end by using a channel quality feedback message.

Step S1412: The transmit end identifies the target auxiliary beam antenna according to the PMI, and determines to use the target auxiliary beam antenna to serve the receive end.

In this embodiment of the present invention, a transmit end may send a first codebook subset restriction instruction carrying at least two PMIs to a receive end, where the at least two PMIs and a RANK separately point to at least two second restriction codebook matrices, so that the receive end may acquire downlink CQIs of equivalent channels of auxiliary beam antennas according to the received mixed pilot signals, the at least two second restriction codebook matrices, and preset pilot signals, the receive end may feed back a PMI of an auxiliary beam antenna corresponding to a maximum downlink CQI to the transmit end, and the transmit end determines to use the auxiliary beam antenna corresponding to the PMI to serve the receive end.

Figure 15A:
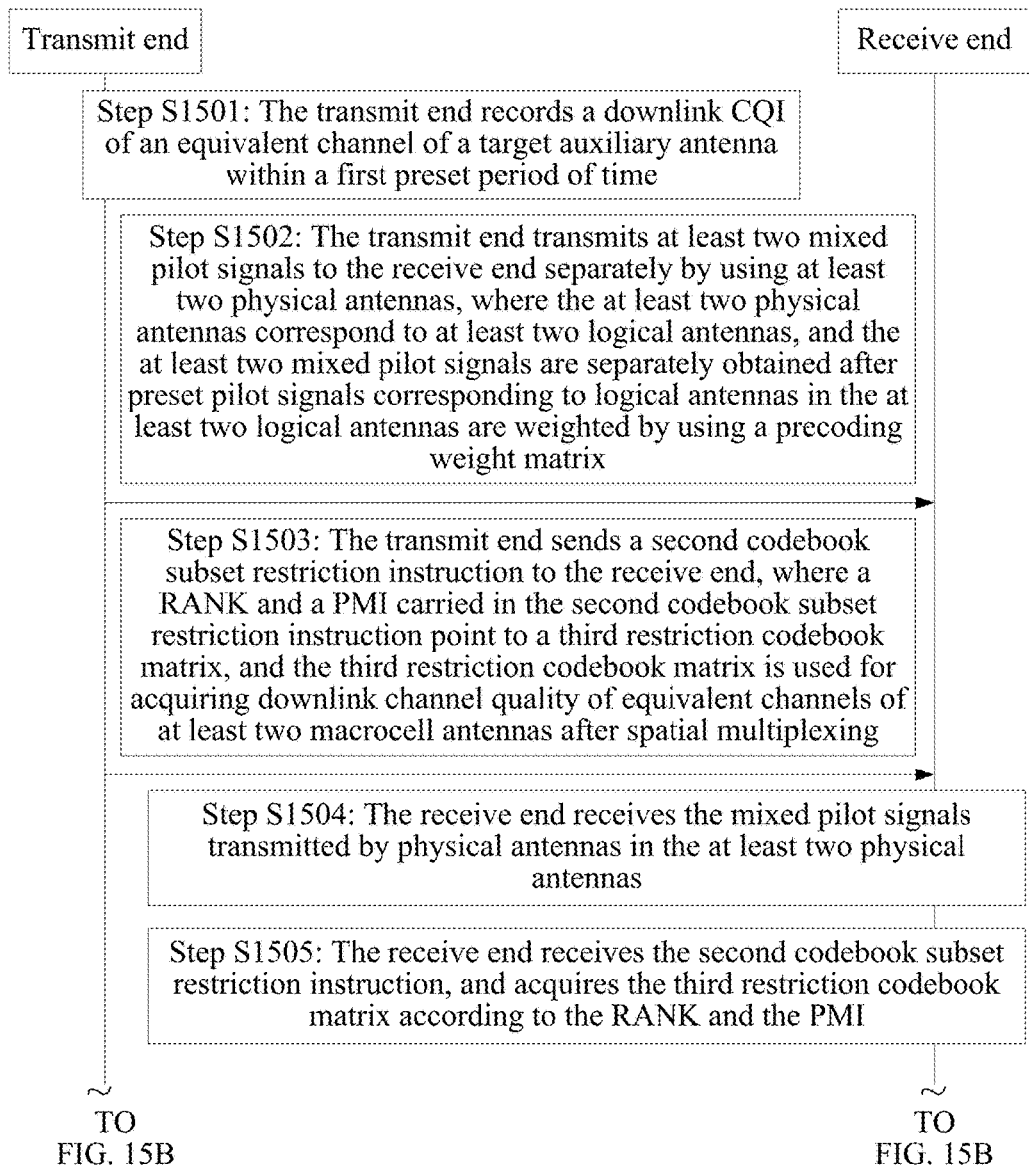

Referring to FIG. 15A and FIG. 15B, FIG. 15A and FIG. 15B are a schematic flowchart of a mobility management method provided in an embodiment of the present invention. The mobility management method provided in this embodiment of the present invention is described from the perspective of a receive end and a transmit end. This embodiment of the present invention is a procedure performed on the basis of that a transmit end determines to use an auxiliary beam antenna to serve a receive end, that is, a procedure that may be further executed in this embodiment of the present invention on the basis of the procedure shown in FIG. 13 or FIG. 14A and FIG. 14B. The transmit end is an outdoor base station, and the receive end may include a terminal such as a mobile phone, a PAD or a notebook computer. The mobility management procedure provided in this embodiment may include:

Step S1501: A transmit end records a downlink CQI of an equivalent channel of a target auxiliary antenna within a first preset period of time.

The target auxiliary beam antenna is an auxiliary beam antenna that serves a receive end currently. When the transmit end determines to use the target auxiliary beam antenna to serve the receive end, the transmit end uses the target auxiliary beam antenna to serve the receive end, and records the downlink CQI of the equivalent channel of the target auxiliary beam antenna within the first preset period of time.

Step S1502: The transmit end transmits at least two mixed pilot signals to a receive end separately by using at least two physical antennas, where the at least two physical antennas correspond to at least two logical antennas, and the at least two mixed pilot signals are separately obtained after preset pilot signals corresponding to logical antennas in the at least two logical antennas are weighted by using a precoding weight matrix.

Step S1503: The transmit end sends a second codebook subset restriction instruction to the receive end, where a RANK and a PMI carried in the second codebook subset restriction instruction point to a third restriction codebook matrix, and the third restriction codebook matrix is used for acquiring downlink channel quality of equivalent channels of at least two macrocell antennas after spatial multiplexing.

After the transmit end determines to use the target auxiliary beam antenna to serve the receive end, when serving duration of the target auxiliary beam antenna reaches the first preset period of time, and when the transmit end separately transmits the at least two mixed pilot signals to the receive end by using the at least two physical antennas, the transmit end sends the second codebook subset restriction instruction to the receive end.

Step S1504: The receive end receives the mixed pilot signals transmitted by physical antennas in the at least two physical antennas.

The receive end detects a common pilot channel in real time, and if the mixed pilot signals are detected, the receive end receives the mixed pilot signals.

Step S1505: The receive end receives the second codebook subset restriction instruction, and acquires the third restriction codebook matrix according to the RANK and the PMI.

The receive end and the transmit end may store a correspondence between a RANK and PMI and a restriction codebook matrix in advance. When receiving the second codebook subset restriction instruction, the receive end may acquire, from the correspondence, a third restriction codebook matrix pointed to by the RANK and the PMI. If the precoding weight matrix is shown by a matrix (2), the third restriction codebook matrix may be shown by a matrix (7), where a correspondence between a RANK and PMI and a restriction codebook matrix should also be the same in both the transmit end and the receive end.

$$\frac{1}{2\sqrt{2}}\begin{bmatrix} 1 & -1 \\ -1 & 1 \\ 1 & 1 \\ -1 & -1 \end{bmatrix} \quad (7)$$

Step S1506: The receive end acquires, according to the received mixed pilot signals and the third restriction codebook matrix, equivalent channels of macrocell antennas after spatial multiplexing.

If the third restriction codebook matrix is shown by the matrix (7), the equivalent channel acquired by the receive end is:

$$H_{\text{eff}} = H\Gamma W_2 = \begin{bmatrix} h^0_{Beam0} & h^0_{Beam1} & h^0_{Macro0} & h^0_{Macro1} \\ h^1_{Beam0} & h^1_{Beam1} & h^1_{Macro0} & h^1_{Macro1} \end{bmatrix} \frac{1}{\sqrt{2}} \begin{bmatrix} 1 & 1 & 1 & 1 \\ 1 & 1 & -1 & -1 \\ 1 & -1 & 1 & -1 \\ 1 & -1 & -1 & 1 \end{bmatrix} * $$

$$\frac{1}{2\sqrt{2}}\begin{bmatrix} 1 & -1 \\ -1 & 1 \\ 1 & 1 \\ -1 & -1 \end{bmatrix} = \begin{bmatrix} h^0_{Beam0} & h^0_{Beam1} & h^0_{Macro0} & h^0_{Macro1} \\ h^1_{Beam0} & h^1_{Beam1} & h^1_{Macro0} & h^1_{Macro1} \end{bmatrix} \begin{bmatrix} 0 & 0 \\ 0 & 0 \\ 1 & 0 \\ 0 & -1 \end{bmatrix} = $$

$$\begin{bmatrix} h^0_{Macro0} & -h^0_{Macro1} \\ h^1_{Macro0} & -h^1_{Macro1} \end{bmatrix}.$$

Step S1507: The receive end acquires downlink channel quality of the equivalent channels of the macrocell antennas according to the equivalent channels of the macrocell antennas in the at least two macrocell antennas.

Specifically, the receive end may acquire a corresponding pilot removal sequence according to preset pilot signals corresponding to the macrocell antennas, and the receive end may remove mixed pilot signals in the acquired equivalent channels according to the pilot removal sequence, so as to obtain the downlink channel quality of the equivalent channels of the macrocell antennas.

Step S1508: The receive end acquires downlink CQIs of the equivalent channels of the macrocell antennas according to the downlink channel quality of the equivalent channels of the macrocell antennas, and sends the downlink CQIs to the transmit end by using a channel quality feedback message.

Specifically, the receive end may acquire signal-to-interference-plus-noise ratios of the equivalent channels of the macrocell antennas according to the downlink channel quality of the equivalent channels of the macrocell antennas, and may acquire the downlink CQIs of the equivalent channels of the macrocell antennas according to a Shannon's equation, and the receive end then sends the downlink CQIs of the equivalent channels of the macrocell antennas to the transmit end by using the channel quality feedback message.

Step S1509: The transmit end acquires downlink spectral efficiency of the equivalent channels of the macrocell antennas according to the downlink CQIs of the equivalent channels of the macrocell antennas, and calculates downlink spectral efficiency of the equivalent channel of the auxiliary beam antenna according to the downlink CQI, of the equivalent channel of the target auxiliary beam antenna, recorded within the first preset period of time.

The downlink spectral efficiency is element transmission efficiency within a unit band, and a value recorded a last time or an average value of values recorded several latest times may be recorded within the first preset period of time.

Step S1510: The transmit end determines, according to the downlink spectral efficiency of the equivalent channels of the macrocell antennas and the downlink spectral efficiency of the equivalent channel of the target auxiliary beam antenna, whether to use any macrocell antenna in the at least two macrocell antennas to serve the receive end.

Preferably, if the downlink spectral efficiency of the target auxiliary beam antenna is less than a preset ratio threshold of downlink spectral efficiency of all macrocell antennas, the transmit end determines to use any macrocell antenna in the at least two macrocell antennas to serve the receive end; otherwise, the transmit end continues to use the target auxiliary beam antenna to serve the receive end.

Optionally, if the downlink spectral efficiency of the target auxiliary beam antenna is less than a preset ratio threshold of downlink spectral efficiency of any macrocell antenna in the at least two macrocell antennas, the transmit end determines to use any macrocell antenna in the at least two macrocell antennas to serve the receive end; otherwise, the transmit end continues to use the target auxiliary beam antenna to serve the receive end.

If the transmit end determines to continue to use the target auxiliary beam antenna to serve the receive end, the transmit end needs to set a RANK and a PMI back to a state before the RANK and the PMI are changed, that is, a RANK and a PMI are made to point to a first restriction codebook matrix used for acquiring downlink channel quality of equivalent channels of at least two auxiliary beam antennas after spatial multiplexing.

In this embodiment of the present invention, when a transmit end uses an auxiliary beam antenna to serve a receive end, the transmit end may send a second codebook subset restriction instruction to the receive end, where a PMI and a RANK in the second codebook subset restriction instruction point to a third restriction codebook matrix, so that the receive end may acquire downlink CQIs of equivalent channels of macrocell antennas according to received mixed pilot signals, the third restriction codebook matrix, and preset pilot signals corresponding to the macrocell antennas, and the transmit end may determine, according to the downlink CQIs of the equivalent channels of the macrocell antennas and a downlink CQI, of an equivalent channel of the auxiliary beam antenna, recorded within a first preset period of time, whether to use any macrocell antenna in at least two macrocell antennas to serve the receive end; for a receive end that is moving, the transmit end may adaptively switch an antenna, thereby improving user experience.

Figure 16A:
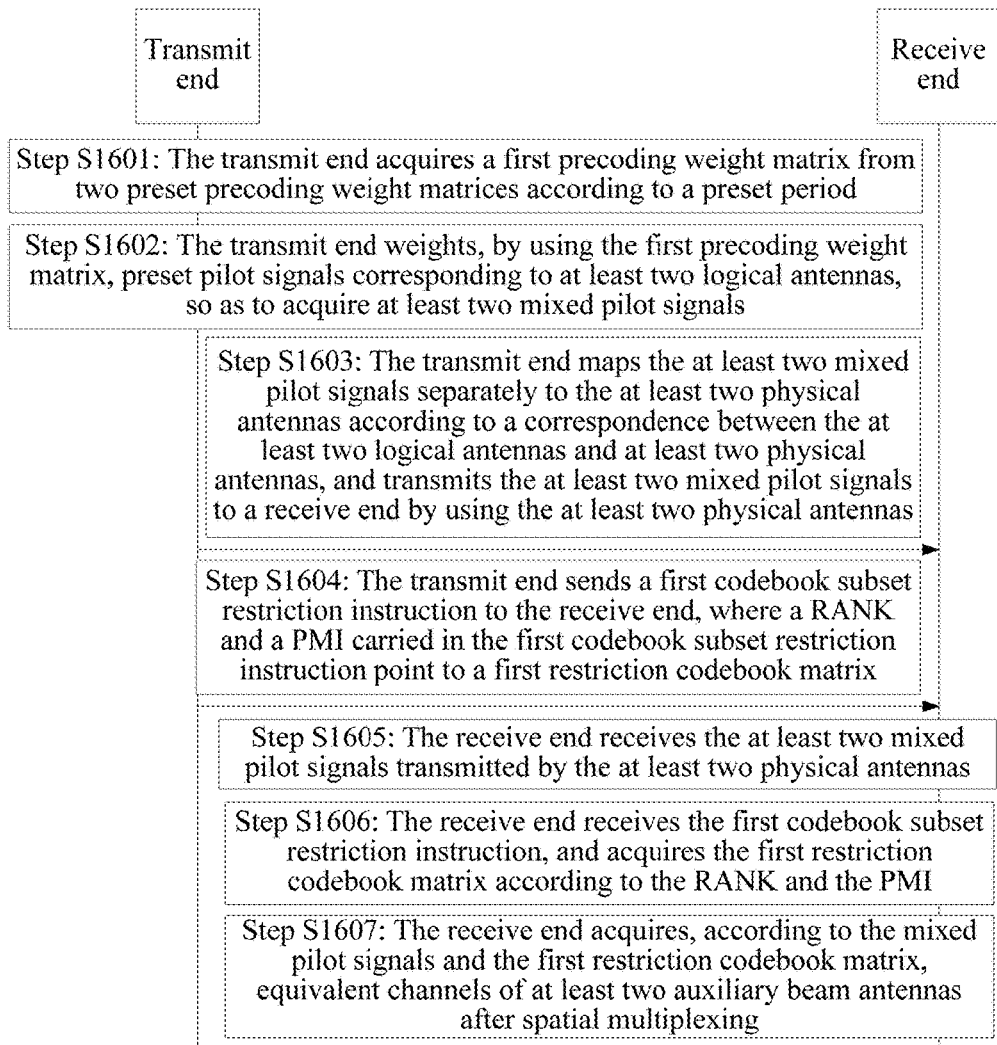
FIG. 16A, FIG. 16B and FIG. 16C are a schematic flowchart of another mobility management method according to an embodiment of the present invention.
Figure 16B:
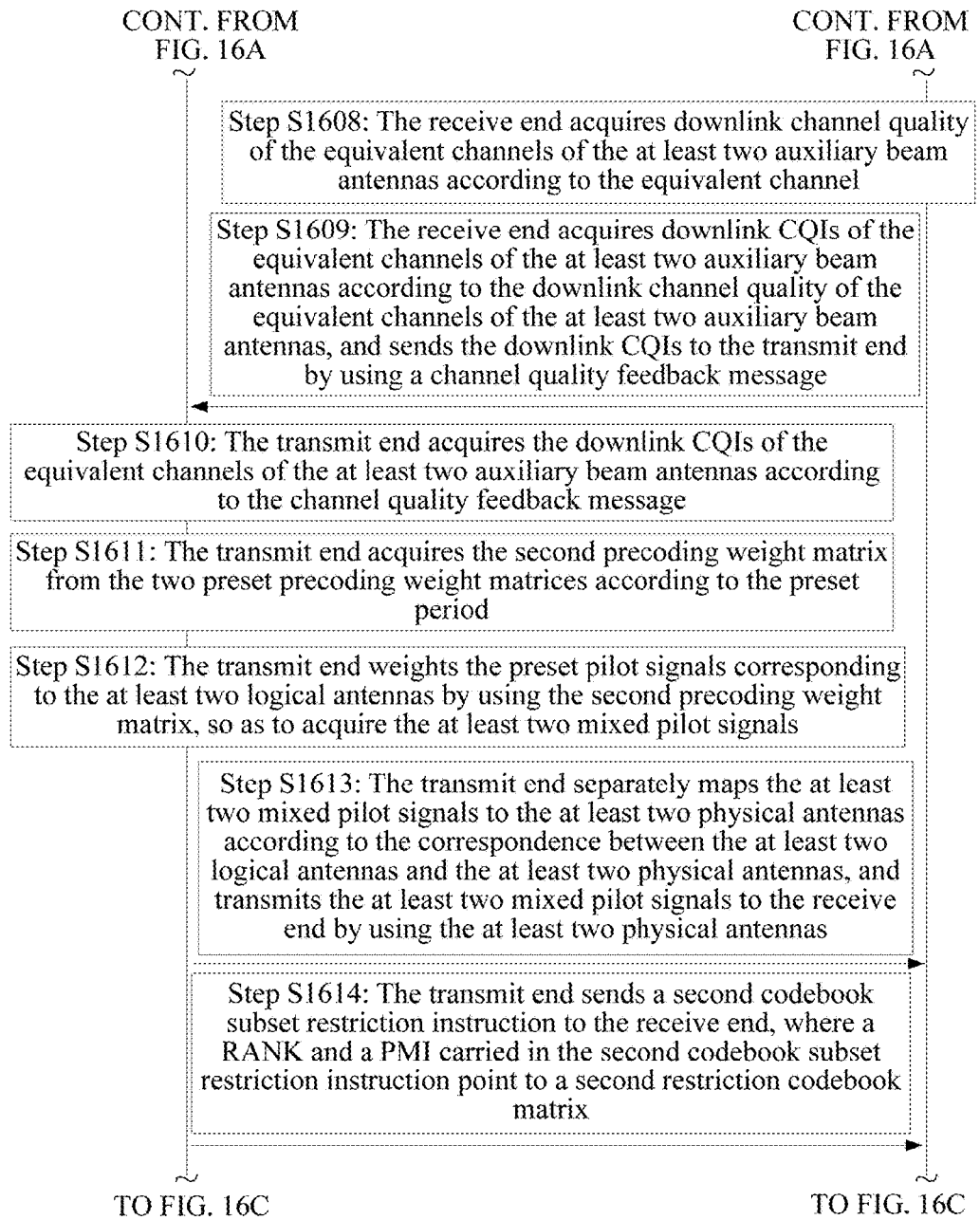
Figure 16C:
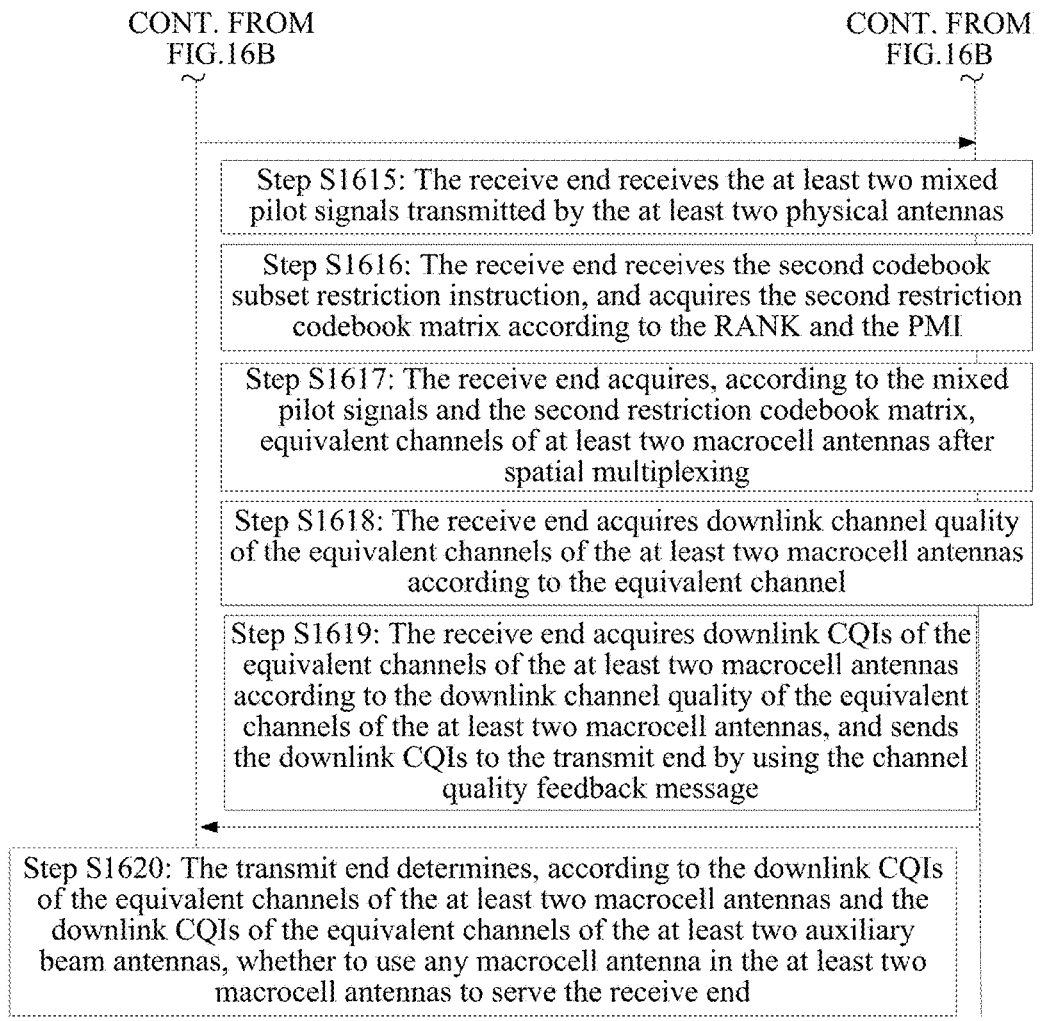

Referring to FIG. 16A, FIG. 16B and FIG. 16C, FIG. 16A, FIG. 16B and FIG. 16C are a schematic flowchart of another mobility management method provided in an embodiment of the present invention. The mobility management method provided in this embodiment of the present invention is described from the perspective of a receive end and a transmit end. The transmit end is an outdoor base station, and the receive end may include a terminal such as a mobile phone, a PAD or a notebook computer. A mobility management procedure provided in this embodiment may include:

Step S1601: A transmit end acquires a first precoding weight matrix from two preset precoding weight matrices according to a preset period.

The transmit end may preset two precoding weight matrices, in which the first precoding weight matrix and a first restriction codebook matrix may be used to implement measurement of downlink channel quality of equivalent channels of at least two auxiliary beam antennas after spatial multiplexing, and a second precoding weight matrix and a second restriction codebook matrix may be used to implement measurement of downlink channel quality of equivalent channels of at least two macrocell antennas after spatial multiplexing.

It is assumed that an order of physical antennas is macro0, macro1, beam0, and beam1, the first precoding weight matrix $\Gamma_B$ is shown by a matrix (8), the first restriction codebook matrix $w_8$ is shown by a matrix (9), the second precoding weight matrix $\Gamma_M$ is shown by a matrix (10), and a second restriction codebook matrix $w_2$ is shown by a matrix (11):

$$\frac{1}{\sqrt{2}}\begin{bmatrix} 0 & 0 & 0 & 0 \\ 0 & 0 & 0 & 0 \\ 1 & 1 & -1 & -1 \\ 1 & 1 & 1 & 1 \end{bmatrix} \quad (8)$$

$$\frac{1}{2\sqrt{2}}\begin{bmatrix} 1 & 1 \\ 1 & 1 \\ -1 & 1 \\ -1 & 1 \end{bmatrix} \quad (9)$$

and therefore, $$\Gamma_B W_8 = \frac{1}{\sqrt{2}}\begin{bmatrix} 0 & 0 & 0 & 0 \\ 0 & 0 & 0 & 0 \\ 1 & 1 & -1 & -1 \\ 1 & 1 & 1 & 1 \end{bmatrix} \frac{1}{2\sqrt{2}}\begin{bmatrix} 1 & 1 \\ 1 & 1 \\ -1 & 1 \\ -1 & 1 \end{bmatrix} = \begin{bmatrix} 0 & 0 \\ 0 & 0 \\ 1 & 0 \\ 0 & 1 \end{bmatrix},$$

that is, the first precoding weight matrix and the first restriction codebook matrix may be used to implement measurement of the downlink channel quality of the equivalent channels of the auxiliary beam antennas after spatial multiplexing;

$$\frac{1}{\sqrt{2}}\begin{bmatrix} 1 & -1 & 1 & -1 \\ -1 & 1 & 1 & -1 \\ 0 & 0 & 0 & 0 \\ 0 & 0 & 0 & 0 \end{bmatrix} \quad (10)$$

$$\frac{1}{2\sqrt{2}}\begin{bmatrix} 1 & -1 \\ -1 & 1 \\ 1 & 1 \\ -1 & -1 \end{bmatrix} \quad (11)$$

and therefore, $$\Gamma_M W_2 = \frac{1}{\sqrt{2}}\begin{bmatrix} 1 & -1 & 1 & -1 \\ -1 & 1 & 1 & -1 \\ 0 & 0 & 0 & 0 \\ 0 & 0 & 0 & 0 \end{bmatrix} \frac{1}{2\sqrt{2}}\begin{bmatrix} 1 & -1 \\ -1 & 1 \\ 1 & 1 \\ -1 & -1 \end{bmatrix} = \begin{bmatrix} 1 & 0 \\ 0 & 1 \\ 0 & 0 \\ 0 & 0 \end{bmatrix},$$

that is, the second precoding weight matrix and the second restriction codebook matrix may be used to implement measurement of downlink channel quality of macrocell antennas after spatial multiplexing; and $$\Gamma_M W_8 = \frac{1}{\sqrt{2}} \begin{bmatrix} 0 & 0 & 0 & 0 \\ 0 & 0 & 0 & 0 \\ 1 & 1 & -1 & -1 \\ 1 & 1 & 1 & 1 \end{bmatrix} \frac{1}{2\sqrt{2}} \begin{bmatrix} 1 & 1 \\ 1 & 1 \\ -1 & 1 \\ -1 & 1 \end{bmatrix} = \begin{bmatrix} 0 & 0 \\ 0 & 0 \\ 0 & 0 \\ 0 & 0 \end{bmatrix}$$

$$\Gamma_B W_2 = \frac{1}{\sqrt{2}} \begin{bmatrix} 0 & 0 & 0 & 0 \\ 0 & 0 & 0 & 0 \\ 1 & 1 & -1 & -1 \\ 1 & 1 & 1 & 1 \end{bmatrix} \frac{1}{2\sqrt{2}} \begin{bmatrix} 1 & -1 \\ -1 & 1 \\ 1 & 1 \\ -1 & -1 \end{bmatrix} = \begin{bmatrix} 0 & 0 \\ 0 & 0 \\ 0 & 0 \\ 0 & 0 \end{bmatrix}$$

that is, a receive end can measure an equivalent channel of a specified antenna only by using a specific precoding weight matrix and a restriction codebook matrix.

The preset period may be a transmit period of a CSI-RS, for example, 5 ms. The transmit end may first acquire the first precoding weight matrix, and then acquire the second precoding weight matrix according to the preset period; the transmit end may also first acquire the second precoding weight matrix, and then acquire the first precoding weight matrix according to the preset period, which is not limited in the present invention.

Step S1602: The transmit end weights, by using the first precoding weight matrix, preset pilot signals corresponding to at least two logical antennas, so as to acquire at least two mixed pilot signals.

The transmit end weights, according to the acquired first precoding weight matrix, preset pilot signals corresponding to the logical antennas, so as to obtain multiple mixed pilot signals. The preset pilot signal includes a CSI-RS.

Step S1603: The transmit end maps the at least two mixed pilot signals separately to the at least two physical antennas according to a correspondence between the at least two logical antennas and at least two physical antennas, and transmits the at least two mixed pilot signals to a receive end by using the at least two physical antennas.

In this embodiment of the present invention, the transmit end needs to acquire a corresponding precoding weight matrix at intervals of a preset period to weight a preset pilot signal in advance, and then maps the preset pilot signal to physical antennas. In other optional embodiments, the transmit end may acquire at least two mixed pilot signals in advance, and directly acquire the at least two mixed pilot signals at intervals of a preset period, that is, the transmit end does need to weight a preset pilot signal within each preset period.

Step S1604: The transmit end sends a first codebook subset restriction instruction to the receive end, where a RANK and a PMI carried in the first codebook subset restriction instruction point to a first restriction codebook matrix.

Step S1605: The receive end receives the at least two mixed pilot signals transmitted by the at least two physical antennas.

Step S1606: The receive end receives the first codebook subset restriction instruction, and acquires the first restriction codebook matrix according to the RANK and the PMI.

Step S1607: The receive end acquires, according to the mixed pilot signals and the first restriction codebook matrix, equivalent channels of at least two auxiliary beam antennas after spatial multiplexing.

Step S1608: The receive end acquires downlink channel quality of the equivalent channels of the at least two auxiliary beam antennas according to the equivalent channel.

Step S1609: The receive end acquires downlink CQIs of the equivalent channels of the at least two auxiliary beam antennas according to the downlink channel quality of the equivalent channels of the at least two auxiliary beam antennas, and sends the downlink CQIs to the transmit end by using a channel quality feedback message.

Step S1610: The transmit end acquires the downlink CQIs of the equivalent channels of the at least two auxiliary beam antennas according to the channel quality feedback message.

Step S1611: The transmit end acquires the second precoding weight matrix from the two preset precoding weight matrices according to the preset period.

Step S1612: The transmit end weights the preset pilot signals corresponding to the at least two logical antennas by using the second precoding weight matrix, so as to acquire the at least two mixed pilot signals.

Step S1613: The transmit end separately maps the at least two mixed pilot signals to the at least two physical antennas according to the correspondence between the at least two logical antennas and the at least two physical antennas, and transmits the at least two mixed pilot signals to the receive end by using the at least two physical antennas.

Step S1614: The transmit end sends a second codebook subset restriction instruction to the receive end, where a RANK and a PMI carried in the second codebook subset restriction instruction point to a second restriction codebook matrix.

Step S1615: The receive end receives the at least two mixed pilot signals transmitted by the at least two physical antennas.

Step S1616: The receive end receives the second codebook subset restriction instruction, and acquires the second restriction codebook matrix according to the RANK and the PMI.

Step S1617: The receive end acquires, according to the mixed pilot signals and the second restriction codebook matrix, equivalent channels of at least two macrocell antennas after spatial multiplexing.

Step S1618: The receive end acquires downlink channel quality of the equivalent channels of the at least two macrocell antennas according to the equivalent channel.

Step S1619: The receive end acquires downlink CQIs of the equivalent channels of the at least two macrocell antennas according to the downlink channel quality of the equivalent channels of the at least two macrocell antennas, and sends the downlink CQIs to the transmit end by using the channel quality feedback message.

Step S1620: The transmit end determines, according to the downlink CQIs of the equivalent channels of the at least two macrocell antennas and the downlink CQIs of the equivalent channels of the at least two auxiliary beam antennas, whether to use any macrocell antenna in the at least two macrocell antennas to serve the receive end.

The transmit end may acquire downlink spectral efficiency of the equivalent channels of at least two macrocell antennas according to the downlink CQIs of the equivalent channels of the at least two macrocell antennas, and acquire downlink spectral efficiency of the equivalent channels of the at least two auxiliary beam antennas according to the downlink CQIs of the equivalent channels of the at least two auxiliary beam antennas. If the downlink spectral efficiency of the at least two macrocell antennas and the downlink spectral efficiency of the at least two auxiliary beam antennas meet any case of the following, the transmit end determines to use any macrocell antenna in the macrocell antennas to serve the receive end:

the downlink spectral efficiency of the equivalent channels of all auxiliary beam antennas is less than a preset ratio threshold of downlink spectral efficiency of equivalent channels of all macrocell antennas;

the downlink spectral efficiency of the equivalent channels of all auxiliary beam antennas is less than a preset ratio threshold of downlink spectral efficiency of an equivalent channel of any macrocell antenna;

the downlink spectral efficiency of the equivalent channel of any auxiliary beam antenna is less than a preset ratio threshold of downlink spectral efficiency of equivalent channels of all macrocell antennas; and the downlink spectral efficiency of the equivalent channel of any auxiliary beam antenna is less than a preset ratio threshold of downlink spectral efficiency of an equivalent channel of any macrocell antenna.

Step S1621: The transmit end and the receive end repeatedly execute step S1601 to step S1620.

An example in which the preset period is 5 ms is used. That is, the transmit end may first acquire the first precoding weight matrix at (T+0) ms, acquire the second precoding weight matrix at (T+5) ms, acquire the first precoding weight matrix at (T+10) ms, and acquire the second precoding weight matrix at (T+15) ms, and the like.

It should be noted that, in this embodiment of the present invention, the transmit end sends different codebook subset restriction instructions in adjacent preset periods. In other optional embodiments, the transmit end may send the same codebook subset restriction instruction in each preset period. That is, the codebook subset restriction instruction carries a RANK and at least two PMIs, the RANK and one PMI point to a first restriction codebook matrix, and the RANK and another PMI point to a second restriction codebook matrix.

In the foregoing embodiment, in a condition that an auxiliary beam antenna serves a receive end, if a transmit end wants to measure downlink channel quality of an equivalent channel of a macrocell antenna, the transmit end needs to reset a RANK and a PMI, and the reset RANK and PMI point to a restriction codebook matrix used for acquiring an equivalent channel of a macrocell antenna after spatial multiplexing. Moreover, if the transmit end determines to still use the auxiliary beam antenna to serve the receive end, the transmit end further needs to reset a RANK and a PMI, and when the RANK and the PMI are being reset, signal interruption may occur. Compared with the foregoing embodiment, in this embodiment, a corresponding RANK and PMI are configured for each precoding weight matrix, and the transmit end only needs to periodically change a precoding weight matrix to implement measurement of channel information in a different state, and do not need to reset a RANK and a PMI, so that operations are simplified and quality of service of a base station is improved.

Figure 17A:
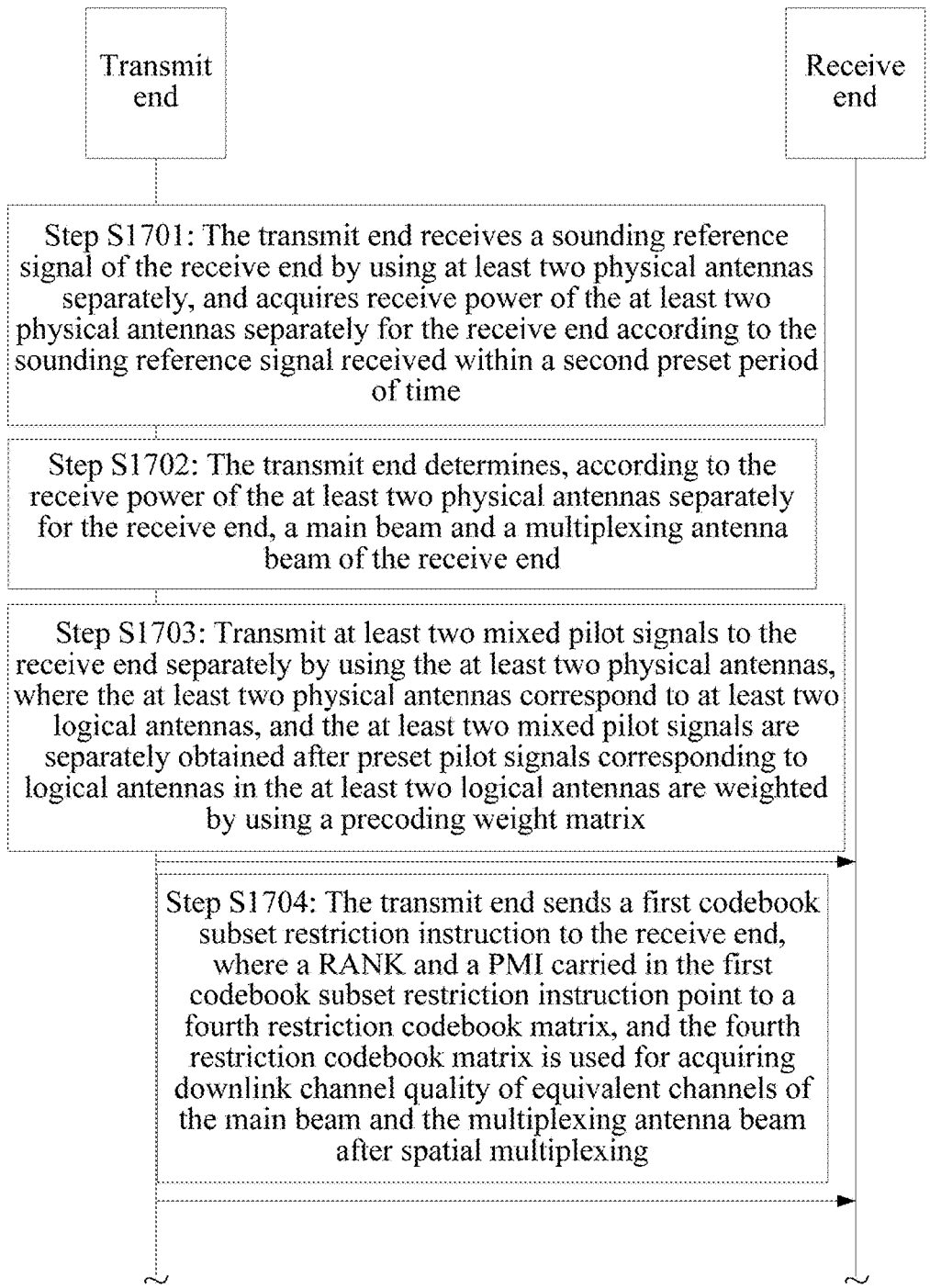
FIG. 17A and FIG. 17B are a schematic flowchart of an indoor beam selection method according to an embodiment of the present invention.
Figure 17B:
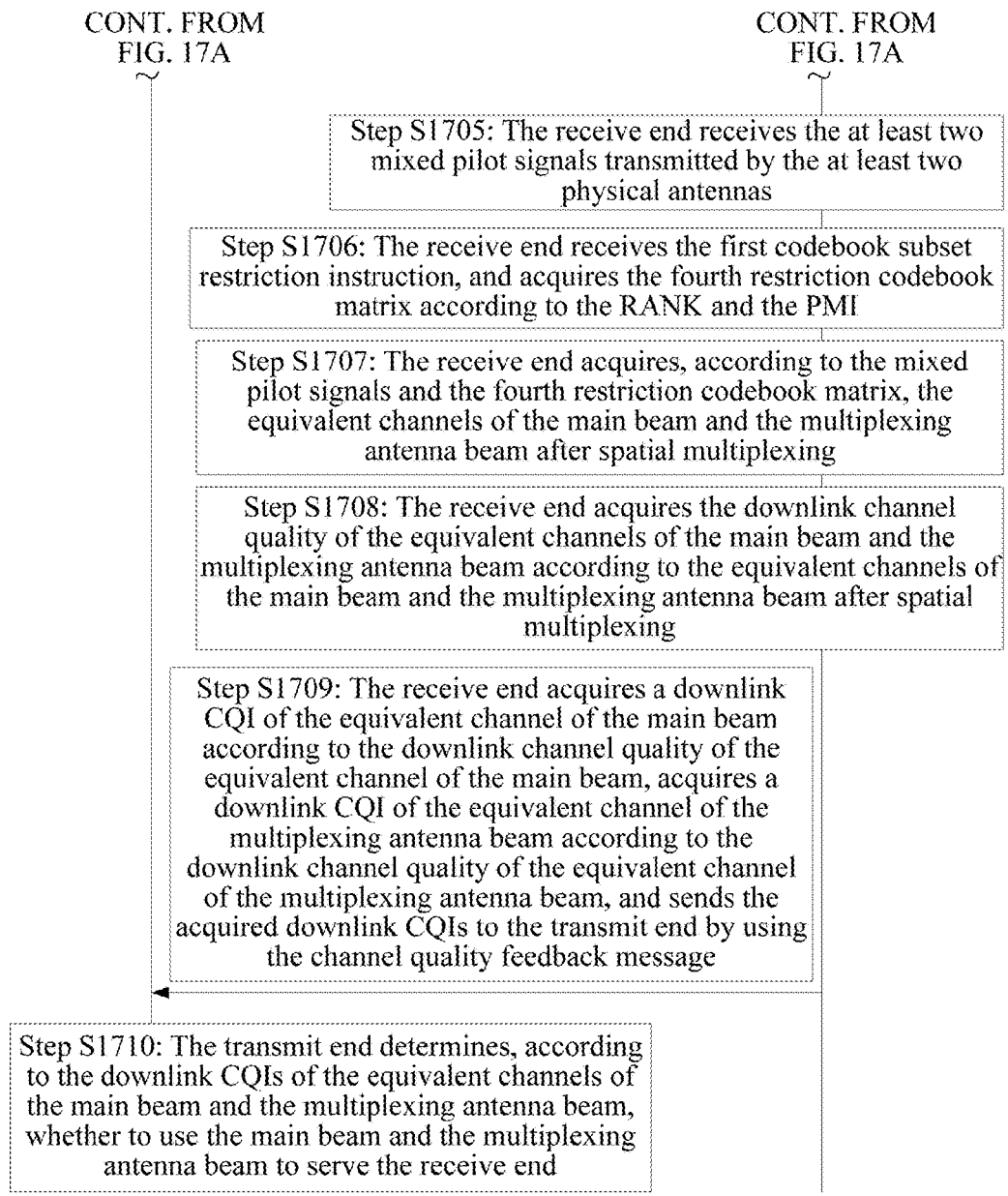

Referring to FIG. 17A and FIG. 17B, FIG. 17A and FIG. 17B are a schematic flowchart of a beam selection method provided in an embodiment of the present invention. The beam selection method provided in this embodiment of the present invention is described from the perspective of a receive end and a transmit end, the transmit end is an indoor base station, and the receive end may include a terminal such as a mobile phone, a PAD or a notebook computer. A beam select procedure provided in this embodiment may include:

Step S1701: A transmit end receives a sounding reference signal of a receive end by using at least two physical antennas separately, and acquires receive power of the at least two physical antennas separately for the receive end according to the sounding reference signal received within a second preset period of time.

Figure 18:
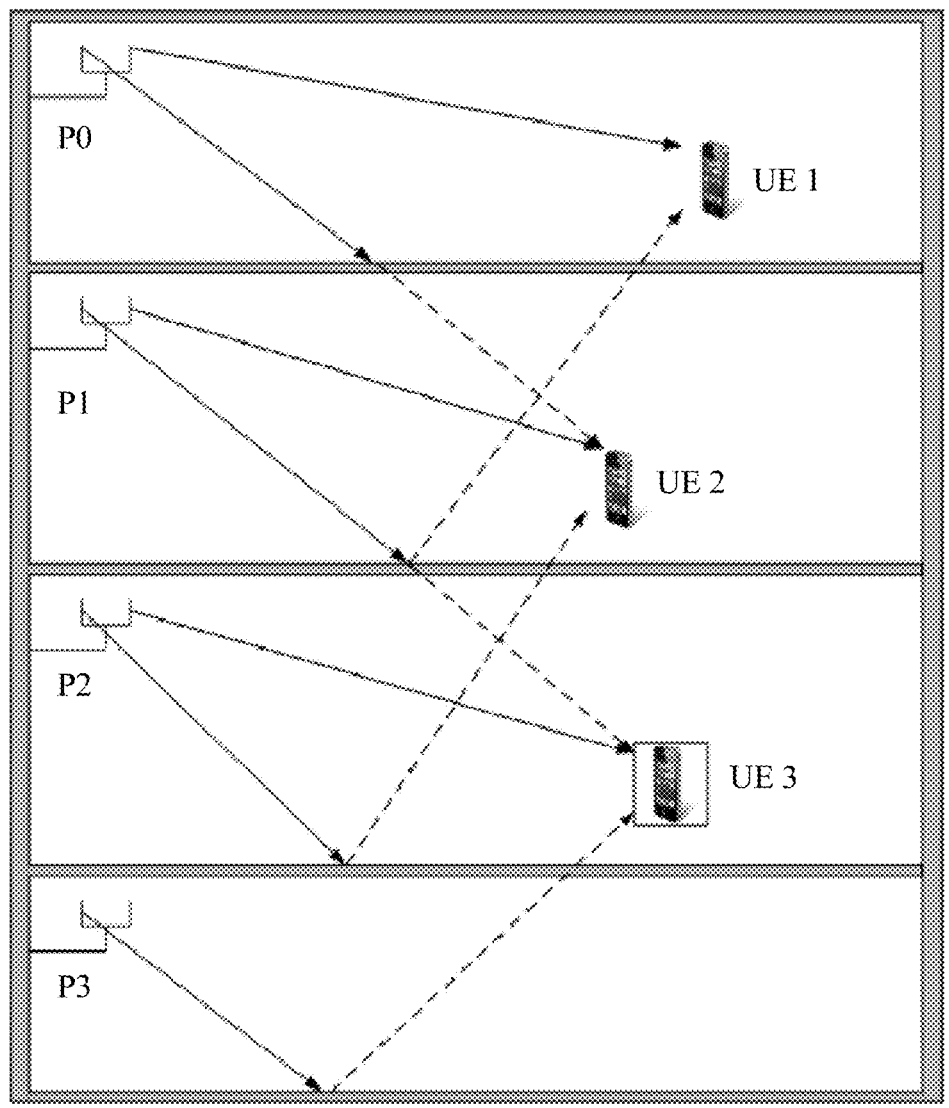
FIG. 18 is a schematic structural diagram of an indoor antenna layout according to an embodiment of the present invention.

In an indoor environment condition, multiple signal antennas are installed on each floor, and a scenario in which multiple serving beams interfere with each other exists between different floors. It is assumed that each room is equipped with one transmit antenna, and a more complex case may be inferred. Generally, to make signals cover each position inside a room better, the transmit antenna usually transmits a main lobe from the ceiling towards a user on the floor surface, and several side lobes in other directions are added. For a specific room on each floor, major interference may be that an antenna signal from a room on an upper floor passes the ceiling and reaches user equipment in the current floor, and an antenna signal from a lower ceiling is reflected by the floor surface to pass through the ceiling to reach the user equipment on the current floor. In addition, an antenna signal adjacent to the room may also interfere with user equipment in the target room. As shown in FIG. 18, an example of upper and lower floors is used to show a schematic diagram of interference generation.

The receive end may periodically send a sounding reference signal. Physical antennas of the transmit end may receive the sounding reference signal of the receive end. The transmit end may use signal strength of sounding reference signals received a last time by physical antennas as receive power of the physical antennas for the receive end separately. The receive end may also obtain a statistical average of signal strength of sounding reference signals received by the physical antennas within a first preset period of time, and use a result of the statistical average as receive power of the physical antennas for the receive end separately.

Step S1702: The transmit end determines, according to the receive power of the at least two physical antennas separately for the receive end, a main beam and a multiplexing antenna beam of the receive end.

By using FIG. 18 as an example, it is assumed that the receive end is UE2, and a main beam is a beam transmitted by an antenna P1. The transmit end may acquire, according to sounding reference signals that are sent by UE2 and are separately received by P0, P1, P2, and P3, receive power of P0, P1, P2, and P3 for UE2 separately, where the transmit end may determine, by using path loss interchangeability, an antenna having maximum receive power as a main beam, and the second strongest receive power as the strongest signal interference. It is assumed that P0 receives the second strongest receive power for UE2, and the transmit end may determine P0 as the multiplexing antenna beam of the main beam.

Step S1703: Transmit at least two mixed pilot signals to the receive end separately by using the at least two physical antennas, where the at least two physical antennas correspond to at least two logical antennas, and the at least two mixed pilot signals are separately obtained after preset pilot signals corresponding to logical antennas in the at least two logical antennas are weighted by using a precoding weight matrix.

Step S1704: The transmit end sends a first codebook subset restriction instruction to the receive end, where a RANK and a PMI carried in the first codebook subset restriction instruction point to a fourth restriction codebook matrix, and the fourth restriction codebook matrix is used for acquiring downlink channel quality of equivalent channels of the main beam and the multiplexing antenna beam after spatial multiplexing.

If the precoding weight matrix is shown by a matrix (2), mixed pilot signals transmitted by P0, P1, P2, and P3 are shown by a matrix (3), and the fourth restriction codebook matrix should be shown by a matrix (4), that is, the fourth restriction codebook matrix may be a first restriction codebook matrix.

Step S1705: The receive end receives the at least two mixed pilot signals transmitted by the at least two physical antennas.

Step S1706: The receive end receives the first codebook subset restriction instruction, and acquires the fourth restriction codebook matrix according to the RANK and the PMI.

Step S1707: The receive end acquires, according to the mixed pilot signals and the fourth restriction codebook matrix, the equivalent channels of the main beam and the multiplexing antenna beam after spatial multiplexing.

If the fourth restriction codebook matrix is shown by the matrix (4), the equivalent channel acquired by the receive end is:

$$H_{\mathit{eff}} = H\Gamma W_8 = \begin{bmatrix} h_{P0}^0 & h_{P1}^0 & h_{P2}^0 & h_{P3}^0 \\ h_{P0}^1 & h_{P1}^1 & h_{P2}^1 & h_{P3}^1 \end{bmatrix} \frac{1}{\sqrt{2}} \begin{bmatrix} 1 & 1 & 1 & 1 \\ 1 & 1 & -1 & -1 \\ 1 & -1 & 1 & -1 \\ 1 & -1 & -1 & 1 \end{bmatrix} *$$

$$\frac{1}{2\sqrt{2}} \begin{bmatrix} 1 & 1 \\ 1 & 1 \\ -1 & 1 \\ -1 & 1 \end{bmatrix} = \begin{bmatrix} h_{P0}^0 & h_{P1}^0 & h_{P2}^0 & h_{P3}^0 \\ h_{P0}^1 & h_{P1}^1 & h_{P2}^1 & h_{P3}^1 \end{bmatrix} \begin{bmatrix} 0 & 1 \\ 1 & 0 \\ 0 & 0 \\ 0 & 0 \end{bmatrix} = \begin{bmatrix} h_{P0}^0 & h_{P0}^0 \\ h_{P1}^1 & h_{P0}^1 \end{bmatrix}$$

Step S1708: The receive end acquires the downlink channel quality of the equivalent channels of the main beam and the multiplexing antenna beam according to the equivalent channels of the main beam and the multiplexing antenna beam after spatial multiplexing.

Step S1709: The receive end acquires a downlink CQI of the equivalent channel of the main beam according to the downlink channel quality of the equivalent channel of the main beam, acquires a downlink CQI of the equivalent channel of the multiplexing antenna beam according to the downlink channel quality of the equivalent channel of the multiplexing antenna beam, and sends the acquired downlink CQIs to the transmit end by using the channel quality feedback message.

Step S1710: The transmit end determines, according to the downlink CQIs of the equivalent channels of the main beam and the multiplexing antenna beam, whether to use the main beam and the multiplexing antenna beam to serve the receive end.

Preferably, if a downlink CQI greater than a second preset threshold exists in the downlink CQIs of the equivalent channels of the main beam and the multiplexing antenna beam, the transmit end determines to use the main beam and the multiplexing antenna beam to serve the receive end.

Optionally, if the downlink CQIs of the equivalent channels of the main beam and the multiplexing antenna beam are both greater than the second preset threshold, the transmit end determines to use the main beam and the multiplexing antenna beam to serve the receive end.

In the implementation of this embodiment of the present invention, a transmit end may determine a multiplexing antenna beam of a main beam according to a sounding reference signal sent by a receive end, and the method for measuring downlink channel quality in Embodiment 1 is then used, so that the transmit end may accurately acquire downlink CQIs of equivalent channels of the main beam and the multiplexing antenna beam. Therefore, the transmit end may accurately determine whether to select the main beam and the multiplexing antenna beam to work together to serve the receive end.

Figure 19:
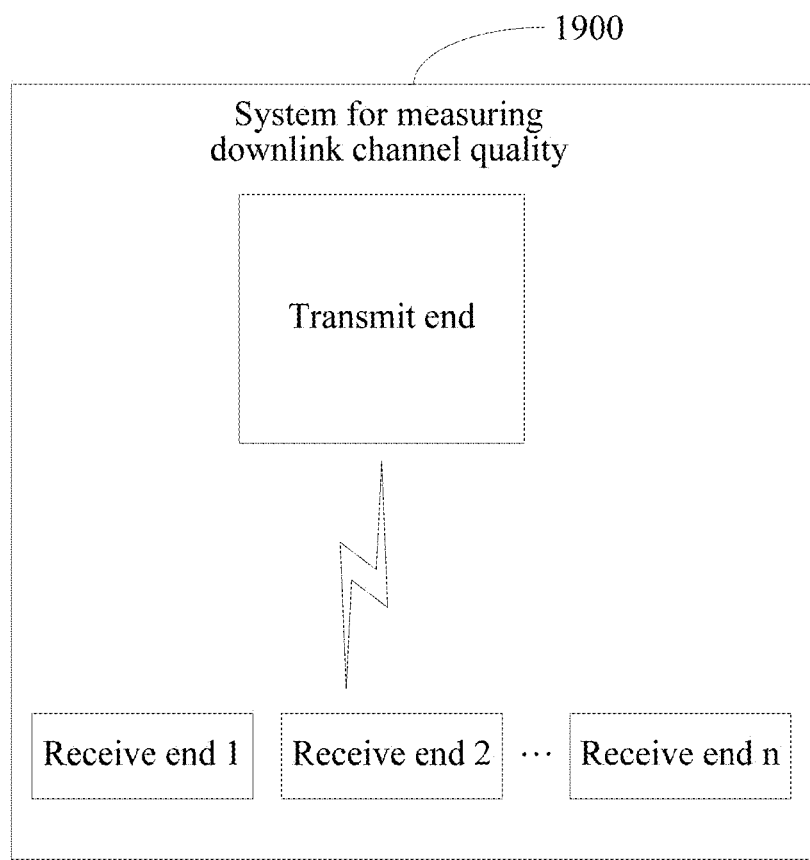
FIG. 19 is a schematic structural diagram of a system for measuring downlink channel quality according to an embodiment of the present invention.

Referring to FIG. 19, FIG. 19 is a schematic structural diagram of a system for measuring downlink channel quality provided in an embodiment of the present invention. The system for measuring downlink channel quality provided in this embodiment of the present invention includes a transmit end and at least one a receive end, where reference may be made to the corresponding embodiments in FIG. 1 to FIG. 11 for the transmit end and the receive end, and details are not described herein again.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The storage medium may include: a magnetic disk, an optical disc, a read-only memory (ROM), or a random access memory (RAM).

What is disclosed above is merely exemplary embodiments of the present invention, and certainly is not intended to limit the protection scope of the present invention. Therefore, equivalent variations made in accordance with the claims of the present invention shall fall within the scope of the present invention.

What is claimed is:

1. A method for measuring downlink channel quality, comprising:

transmitting separately, by a base station to a user terminal, at least two mixed pilot signals by using at least two physical antennas corresponding to at least two logical antennas, wherein the at least two mixed pilot signals are separately obtained after preset pilot signals corresponding to logical antennas in the at least two logical antennas are weighted by using a precoding weight matrix;

transmitting, by the base station to the user terminal, a first codebook subset restriction instruction carrying a rank indication RANK and at least one precoding matrix index (PMI), wherein the mixed pilot signals, the first codebook subset restriction instruction, and the preset pilot signals are used to acquire downlink channel quality of an equivalent channel of a specified antenna; and receiving, by the base station from the user terminal, a channel quality feedback message associated with the downlink channel quality of the equivalent channel of the specified antenna;

wherein the first codebook subset restriction instruction carries at least two PMIs, the RANK and each PMI in the at least two PMIs point to a second restriction codebook matrix in at least two second restriction codebook matrices, and the at least two second restriction codebook matrices are separately used to acquire downlink channel quality of equivalent channels of at least two auxiliary beam antennas of the base station;

the channel quality feedback message comprises a PMI corresponding to a target auxiliary beam antenna, the mixed pilot signals, the at least two second restriction codebook matrices, and the preset pilot signals are used for determination of the target auxiliary beam antenna;

identifying, by the base station, the target auxiliary beam antenna according to the channel quality feedback message; and determining, by the base station, to use the target auxiliary beam antenna to serve the user terminal.

2. The method according to claim 1, wherein the method further comprises:

recording, by the base station, a downlink CQI of an equivalent channel of the target auxiliary beam antenna within a first preset period of time;

sending, by the base station to the user terminal, a second codebook subset restriction instruction, wherein a RANK and a PMI carried in the second codebook subset restriction instruction point to a third restriction codebook matrix, and the third restriction codebook matrix is used to acquire downlink channel quality of equivalent channels of at least two macrocell antennas of the base station after spatial multiplexing; the channel quality feedback message further comprises downlink CQIs of the equivalent channels of the at least two macrocell antennas; and determining, by the base station according to the downlink CQIs of the equivalent channels of the macrocell antennas and the downlink CQI of the equivalent channel of the target auxiliary beam antenna recorded within the first preset period of time, whether to use a macrocell antenna in the at least two macrocell antennas to serve the user terminal.

3. The method according to claim 2, wherein determining whether to use a macrocell antenna in the at least two macrocell antennas to serve the user terminal comprises:

acquiring, by the base station, downlink spectral efficiency of the equivalent channels of the macrocell antennas according to the downlink CQIs of the equivalent channels of the macrocell antennas, calculating downlink spectral efficiency of the equivalent channel of the target auxiliary beam antenna according to the recorded downlink CQI of the equivalent channel of the target auxiliary beam antenna within the first preset period of time; and determining, by the base station according to the downlink spectral efficiency of the equivalent channels of the macrocell antennas and the downlink spectral efficiency of the equivalent channel of the target auxiliary beam antenna, whether to use a macrocell antenna in the at least two macrocell antennas to serve the user terminal.

4. The method according to claim 1, wherein before sending the first codebook subset restriction instruction to the user terminal, the method further comprises:

receiving, by the base station within a second preset period of time, a sounding reference signal of the user terminal by using the at least two physical antennas separately;

acquiring, by the base station, receive power of the at least two physical antennas separately for the user terminal according to the sounding reference signal received within the second preset period of time; and determining, by the base station according to the receive power of the at least two physical antennas separately for the user terminal, that the user terminal meets an initial condition of using an auxiliary beam antenna.

5. The method according to claim 1, wherein before sending the first codebook subset restriction instruction to the user terminal;

receiving, by the base station within a second preset period of time, a sounding reference signal of the user terminal by using the at least two physical antennas separately;

acquiring, by the base station, receive power of the at least two physical antennas separately for the user terminal according to the sounding reference signal received within the second preset period of time;

determining, by the base station, according to the receive power of the at least two physical antennas separately for the user terminal, a main beam and a multiplexing antenna beam of the user terminal; wherein the RANK and the PMI point to a fourth restriction codebook matrix, and the fourth restriction codebook matrix is used for acquiring downlink channel quality of equivalent channels of the main beam and the multiplexing antenna beam after spatial multiplexing;

the channel quality feedback message comprises a downlink CQI of the equivalent channel of the main beam and a downlink CQI of the equivalent channel of the multiplexing antenna beam; and determining, by the base station according to the downlink CQI of the equivalent channel of the main beam and the downlink CQI of the equivalent channel of the multiplexing antenna beam, whether to use the main beam and the multiplexing antenna beam to serve the user terminal.

6. A base station, comprising:

a transmitter, configured to transmit separately to a user terminal at least two mixed pilot signals by using at least two physical antennas in the wireless transceiver apparatus, wherein the at least two physical antennas correspond to at least two logical antennas, and the at least two mixed pilot signals are separately obtained after preset pilot signals corresponding to logical antennas in the at least two logical antennas are weighted by using a precoding weight matrix; and to send a first codebook subset restriction instruction to the user terminal, wherein the first codebook subset restriction instruction carries a rank indication RANK and at least one precoding matrix index (PMI), wherein the mixed pilot signals, the first codebook subset restriction instruction, and the preset pilot signals are used for acquisition of downlink channel quality of an equivalent channel of a specified antenna; and a receiver, configured to receive from the user terminal a channel quality feedback message associated with the downlink channel quality of the equivalent channel of the specified antenna;

wherein the first codebook subset restriction instruction carries at least two PMIs, the RANK and each PMI in the at least two PMIs point to a second restriction codebook matrix in at least two second restriction codebook matrices, and the at least two second restriction codebook matrices are separately used to acquire downlink channel quality of equivalent channels of at least two auxiliary beam antennas of the base station;

the channel quality feedback message comprises a PMI corresponding to a target auxiliary beam antenna, the mixed pilot signals, the at least two second restriction codebook matrices, and the preset pilot signals are used for determination of the target auxiliary beam antenna; and the base station further comprises a processor configured to identify the target auxiliary beam antenna according to the channel quality feedback message, and determine to use the target auxiliary beam antenna to serve the user terminal.

7. The base station according to claim 6, further comprising a memory configured to record a downlink CQI of an equivalent channel of the target auxiliary beam antenna within a first preset period of time; wherein
the transmitter is further configured to send to the user terminal a second codebook subset restriction instruction, wherein a RANK and a PMI carried in the second codebook subset restriction instruction point to a third restriction codebook matrix, and the third restriction codebook matrix is used for acquiring downlink channel quality of equivalent channels of at least two macrocell antennas of the base station after spatial multiplexing;
the channel quality feedback message further comprises downlink CQIs of the equivalent channels of the at least two macrocell antennas; and
the processor is configured to determine, according to the downlink CQIs of the equivalent channels of the macrocell antennas and the downlink CQI of the equivalent channel of the target auxiliary beam antenna recorded within the first preset period of time, whether to use a macrocell antenna in the at least two macrocell antennas to serve the user terminal.

8. The base station according to claim 7, wherein the processor is configured to:
acquire downlink spectral efficiency of the equivalent channels of the macrocell antennas according to the downlink CQIs of the equivalent channels of the macrocell antennas; and
calculate downlink spectral efficiency of the equivalent channel of the target auxiliary beam antenna according to the recorded downlink CQI of the equivalent channel of the target auxiliary beam antenna within the first preset period of time; determine, according to the downlink spectral efficiency of the equivalent channels of the macrocell antennas and the downlink spectral efficiency of the equivalent channel of the target auxiliary beam antenna, whether to use a macrocell antenna in the at least two macrocell antennas to serve the user terminal.

9. The base station according to claim 6, wherein
the receiver is further configured to receive, within a second preset period of time, a sounding reference signal of the user terminal by using the at least two physical antennas separately; and
the processor is configured to acquire receive power of the at least two physical antennas separately for the user terminal according to the sounding reference signal received within the second preset period of time; determine, according to the receive power of the at least two physical antennas separately for the user terminal, that the user terminal meets an initial condition of using an auxiliary beam antenna; and after the transmitter transmits the mixed pilot signals to the user terminal, trigger the transmitter to send the first codebook subset restriction instruction to the user terminal.

10. The base station according to claim 6, wherein
the receiver is further configured to receive, within a second preset period of time, a sounding reference signal of the user terminal by using the at least two physical antennas separately;

the processor is configured to acquire receive power of the at least two physical antennas separately for the user terminal according to the sounding reference signal received within the second preset period of time; determine, according to the receive power of the at least two physical antennas separately for the user terminal, a main beam and a multiplexing antenna beam of the user terminal;
the RANK and the PMI point to a fourth restriction codebook matrix, and the fourth restriction codebook matrix is used for acquiring downlink channel quality of equivalent channels of the main beam and the multiplexing antenna beam after spatial multiplexing;
the channel quality feedback message comprises a downlink CQI of the equivalent channel of the main beam and a downlink CQI of the equivalent channel of the multiplexing antenna beam; and
the processor is configured to, after the channel quality feedback message is received, determine, according to the downlink CQI of the equivalent channel of the main beam and the downlink CQI of the equivalent channel of the multiplexing antenna beam, whether to use the main beam and the multiplexing antenna beam to serve the user terminal.

11. A non-transitory computer-readable storage medium, wherein the non-transitory computer-readable storage medium stores a program, and the program, when executed, causes a base station to perform a method comprising:
transmitting separately to a user terminal at least two mixed pilot signals by using at least two physical antennas, corresponding to at least two logical antennas, and the at least two mixed pilot signals are separately obtained after preset pilot signals corresponding to logical antennas in the at least two logical antennas are weighted by using a precoding weight matrix;
sending to the user terminal a first codebook subset restriction instruction carrying a rank indication RANK and at least one precoding matrix index (PMI), wherein the mixed pilot signals, the first codebook subset restriction instruction, and the preset pilot signals are used for acquisition of downlink channel quality of an equivalent channel of a specified antenna; and
receiving a channel quality feedback message from the user terminal which is associated with the downlink channel quality of the equivalent channel of the specified antenna;
wherein the first codebook subset restriction instruction carries at least two PMIs, the RANK and each PMI in the at least two PMIs point to a second restriction codebook matrix in at least two second restriction codebook matrices, and the at least two second restriction codebook matrices are separately used for acquiring downlink channel quality of equivalent channels of at least two auxiliary beam antennas of the base station;
the channel quality feedback message comprises a PMI corresponding to a target auxiliary beam antenna, the mixed pilot signals, the at least two second restriction codebook matrices, and the preset pilot signals are used for determination of the target auxiliary beam antenna;
identifying, by the base station, the target auxiliary beam antenna according to the channel quality feedback message; and
determining, by the base station, to use the target auxiliary beam antenna to serve the user terminal.

12. The non-transitory computer-readable storage medium according to claim 11, further comprising:
- recording, by the base station, a downlink CQI of an equivalent channel of the target auxiliary beam antenna within a first preset period of time;
- sending, by the base station to the user terminal, a second codebook subset restriction instruction, wherein a RANK and a PMI carried in the second codebook subset restriction instruction point to a third restriction codebook matrix, and the third restriction codebook matrix is used to acquire downlink channel quality of equivalent channels of at least two macrocell antennas of the base station after spatial multiplexing; the channel quality feedback message further comprises downlink CQIs of the equivalent channels of the at least two macrocell antennas; and
- determining, by the base station according to the downlink CQIs of the equivalent channels of the macrocell antennas and the downlink CQI of the equivalent channel of the target auxiliary beam antenna recorded within the first preset period of time, whether to use a macrocell antenna in the at least two macrocell antennas to serve the user terminal.

13. The non-transitory computer-readable storage medium according to claim 12, wherein determining whether to use a macrocell antenna in the at least two macrocell antennas to serve the user terminal comprises:
- acquiring, by the base station, downlink spectral efficiency of the equivalent channels of the macrocell antennas according to the downlink CQIs of the equivalent channels of the macrocell antennas,
- calculating downlink spectral efficiency of the equivalent channel of the target auxiliary beam antenna according to the recorded downlink CQI of the equivalent channel of the target auxiliary beam antenna within the first preset period of time; and
- determining, by the base station according to the downlink spectral efficiency of the equivalent channels of the macrocell antennas and the downlink spectral efficiency of the equivalent channel of the target auxiliary beam antenna, whether to use a macrocell antenna in the at least two macrocell antennas to serve the user terminal.

14. The non-transitory computer-readable storage medium according to claim 11, wherein before sending the first codebook subset restriction instruction to the user terminal, further comprising:
- receiving, by the base station within a second preset period of time, a sounding reference signal of the user terminal by using the at least two physical antennas separately;
- acquiring, by the base station, receive power of the at least two physical antennas separately for the user terminal according to the sounding reference signal received within the second preset period of time; and
- determining, by the base station according to the receive power of the at least two physical antennas separately for the user terminal, that the user terminal meets an initial condition of using an auxiliary beam antenna.

15. The non-transitory computer-readable storage medium according to claim 11, wherein before sending the first codebook subset restriction instruction to the user terminal;
- receiving, by the base station within a second preset period of time, a sounding reference signal of the user terminal by using the at least two physical antennas separately;
- acquiring, by the base station, receive power of the at least two physical antennas separately for the user terminal according to the sounding reference signal received within the second preset period of time;
- determining, by the base station, according to the receive power of the at least two physical antennas separately for the user terminal, a main beam and a multiplexing antenna beam of the user terminal; wherein
- the RANK and the PMI point to a fourth restriction codebook matrix, and the fourth restriction codebook matrix is used for acquiring downlink channel quality of equivalent channels of the main beam and the multiplexing antenna beam after spatial multiplexing;
- the channel quality feedback message comprises a downlink CQI of the equivalent channel of the main beam and a downlink CQI of the equivalent channel of the multiplexing antenna beam; and
- determining, by the base station according to the downlink CQI of the equivalent channel of the main beam and the downlink CQI of the equivalent channel of the multiplexing antenna beam, whether to use the main beam and the multiplexing antenna beam to serve the user terminal.

* * * * *